US011926146B2

(12) United States Patent
Tomida et al.

(10) Patent No.: US 11,926,146 B2
(45) Date of Patent: Mar. 12, 2024

(54) RECORDING APPARATUS

(71) Applicant: CANON KABUSHIKI KAISHA, Tokyo (JP)

(72) Inventors: Asako Tomida, Kanagawa (JP); Norihiro Kawatoko, Kanagawa (JP); Masashi Hayashi, Kanagawa (JP); Kentaro Muro, Tokyo (JP); Toshiaki Somano, Kanagawa (JP); Shuichi Tokuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 17/691,724

(22) Filed: Mar. 10, 2022

(65) Prior Publication Data

US 2022/0314645 A1 Oct. 6, 2022

(30) Foreign Application Priority Data

Mar. 30, 2021 (JP) ................................ 2021-058389

(51) Int. Cl.
*B41J 11/00* (2006.01)

(52) U.S. Cl.
CPC ................................ *B41J 11/0005* (2013.01)

(58) Field of Classification Search
CPC .................................................... B41J 11/0005
See application file for complete search history.

(56) References Cited

U.S. PATENT DOCUMENTS 9,403,379 B2 * 8/2016 Kohnotoh .................. B41J 3/60
2019/0366739 A1 12/2019 Somano

FOREIGN PATENT DOCUMENTS

JP 2015166149 A * 9/2015
JP 6536128 B2 * 7/2019

* cited by examiner

*Primary Examiner* — Sharon Polk
(74) *Attorney, Agent, or Firm* — Canon U.S.A., Inc. IP Division

(57) ABSTRACT

A recording apparatus includes a recording unit, a conveyance unit, an application amount information acquisition unit, a determination unit, a direction information acquisition unit, and a setting unit. The recording unit performs recording by applying ink to paper. The application amount information acquisition unit acquires information related to an amount of ink that the recording unit applies to a predetermined region of the paper. The determination unit determines execution of prevention or reduction processing for preventing or reducing curling occurring after recording is performed. The determination is made according to the acquired amount of ink. The direction information acquisition unit acquires information indicating a paper grain direction of the paper relative to a conveyance direction in which the conveyance unit conveys the paper. The setting unit sets the predetermined region according to the paper grain direction relative to the conveyance direction indicated by the acquired paper grain direction information.

17 Claims, 19 Drawing Sheets

| REGION IN PREDETERMINED REGION S0 | WEIGHTING COEFFICIENT |
|---|---|
| REGION S1 | 4 |
| REGION S2 | 3 |
| REGION S3 | 2 |
| REGION S4 | 1 |

FIG.15

PAPER GRAIN DIRECTION DETERMINATION TABLE

| PAPER TYPE | PAPER SIZE | PAPER FEED DIRECTION | PAPER GRAIN DIRECTION RELATIVE TO CONVEYANCE DIRECTION |
|---|---|---|---|
| PLAIN PAPER, RECYCLED PAPER, THIN PAPER, HEAVY PAPER, POSTCARD | A4 | LONGITUDINAL FEED | PARALLEL |
| | | TRANSVERSE FEED | PERPENDICULAR |
| | A3 | LONGITUDINAL FEED | PARALLEL |
| | | TRANSVERSE FEED | PERPENDICULAR |
| SPECIAL PAPER | A4 | LONGITUDINAL FEED | PERPENDICULAR |
| | | TRANSVERSE FEED | PARALLEL |
| | A3 | LONGITUDINAL FEED | PERPENDICULAR |
| | | TRANSVERSE FEED | PARALLEL |

FIG.17A

| CORRECTION VALUE CORRESPONDING TO TYPE OF RECORDING MEDIUM | |
|---|---|
| PAPER TYPE | VALUE |
| THIN PAPER | 40 |
| PLAIN PAPER | 30 |
| HEAVY PAPER | 50 |
| RECYCLED PAPER | 50 |
| POSTCARD | 0 |
| ENVELOPE | 0 |

FIG.17B

| CORRECTION VALUE CORRESPONDING TO TEMPERATURE AND HUMIDITY ENVIRONMENT | | HUMIDITY (%) [H] | | |
|---|---|---|---|---|
| | | H > 50 | 50 ≥ H > 20 | 20 ≥ H |
| TEMPERATURE (°C) [S] | S > 25 | -80 | -80 | -80 |
| | 25 ≥ S > 15 | -80 | -10 | -10 |
| | 15 ≥ S | -80 | -10 | 50 |

FIG.19A
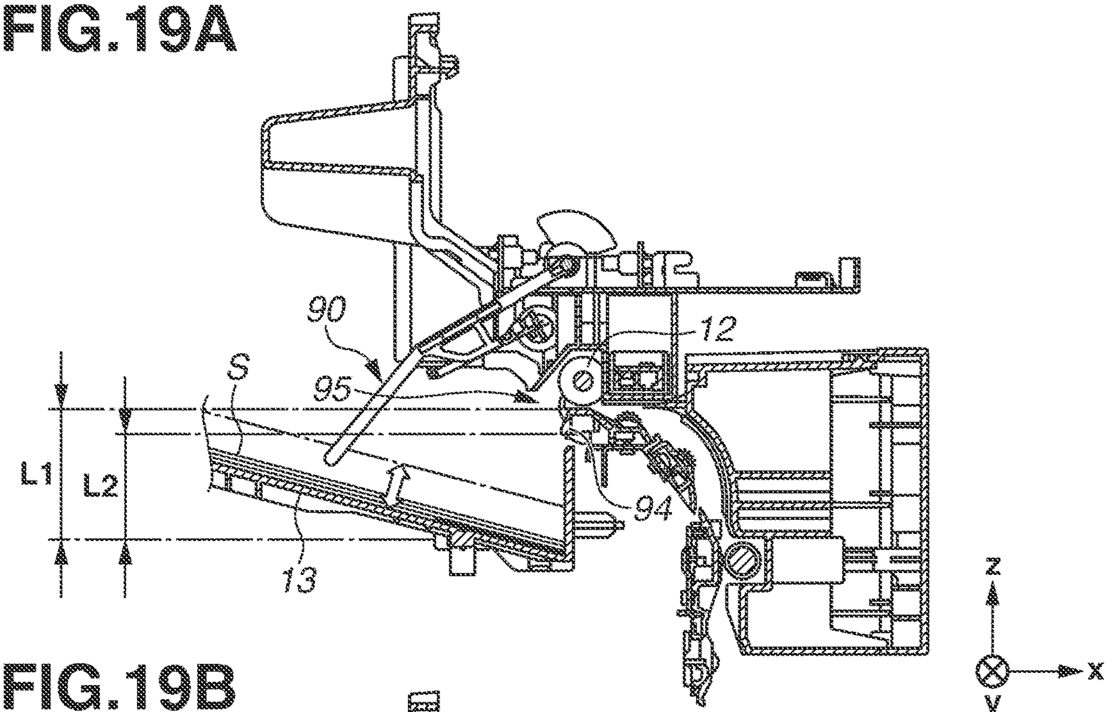
FIG.19B
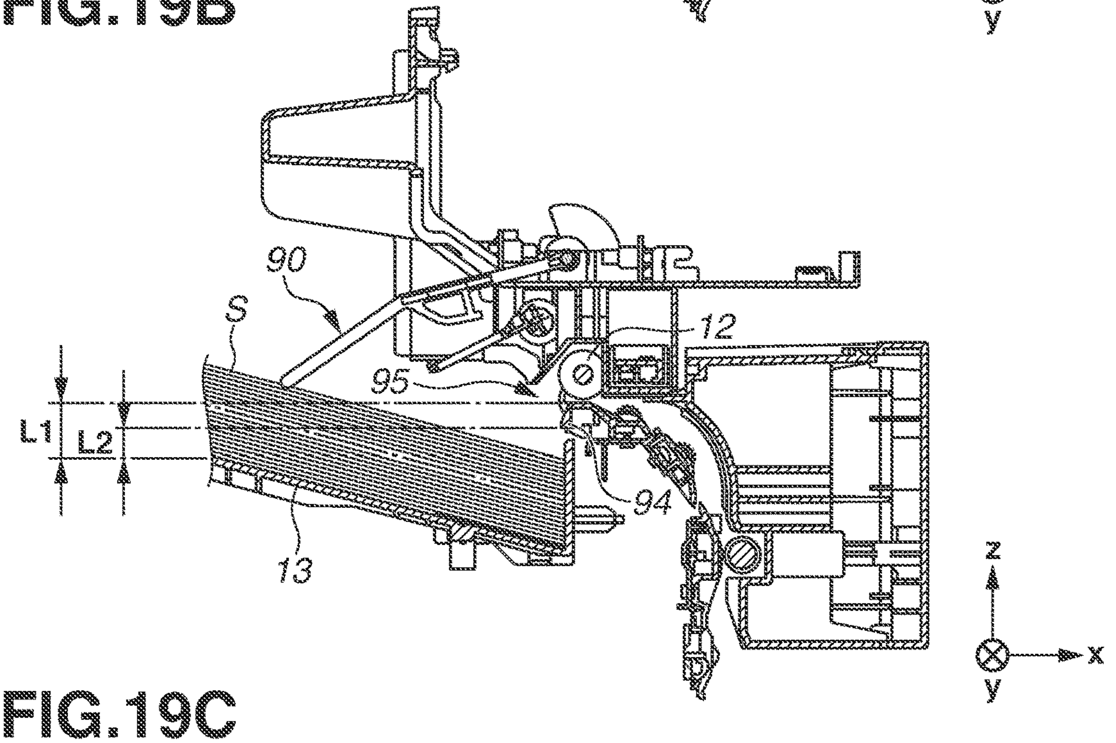
FIG.19C
| CORRECTION VALUE CORRESPONDING TO STACKING AMOUNT AND SORT INFORMATION | | |
|---|---|---|
| STACKING AMOUNT | ABSENCE OF SORT | PRESENCE OF SORT |
| LESS THAN 14 mm | 0 | 20 |
| 14 mm OR MORE | 30 | 50 |

RECORDING APPARATUS

BACKGROUND

Field

Aspects of the present disclosure generally relate to a recording apparatus.

Description of the Related Art

Applying ink to a recording medium may cause curling in the recording medium. If curling occurs in the recording medium, a jam may occur at the time of conveyance or discharge of the recording medium.

U.S. Patent Application Publication No. 2019/0366739 discusses determining execution of curling prevention or reduction processing based on the amount of application of ink to predetermined regions at four corners of a recording medium.

Furthermore, in the manufacturing process of paper, paper fibers are made to flow along a given direction, and this is called paper grain. The paper grain also affects the manner of curling of paper occurring in a case where ink has been applied to a sheet of paper. While, with respect to a sheet of paper the paper grain direction of which is the same as the conveyance direction of a recording medium, curling prevention or reduction processing can be performed according to the amount of application of ink to predetermined regions in the sheet of paper as discussed in U.S. Patent Application Publication No. 2019/0366739, such curling prevention or reduction processing may not become appropriate curling prevention or reduction processing with respect to a sheet of paper the paper grain direction of which is different from the conveyance direction of a recording medium.

SUMMARY

According to an aspect of the present disclosure, a recording apparatus includes a recording unit configured to perform recording by applying ink to paper, a conveyance unit configured to convey the paper, an application amount information acquisition unit configured to acquire information related to an ink application amount of ink which is applied to a predetermined region of the paper by the recording unit, a determination unit configured to determine execution of prevention or reduction processing for preventing or reducing curling occurring after recording performed by the recording unit, wherein the determination is made according to an amount of ink applied to the predetermined region of the paper indicated by the acquired ink application amount information, a direction information acquisition unit configured to acquire information indicating a paper grain direction of the paper relative to a conveyance direction in which the conveyance unit conveys the paper, and a setting unit configured to set the predetermined region according to the paper grain direction relative to the conveyance direction indicated by the acquired paper grain direction information.

Further features of the present disclosure will become apparent from the following description of exemplary embodiments with reference to the attached drawings.

BRIEF DESCRIPTION OF THE DRAWINGS

FIG. 15 is a diagram illustrating a paper grain direction determination table in the first exemplary embodiment.

FIGS. 17A and 17B are diagrams used to explain correction values that are based on the type of recording medium and a temperature and humidity environment, respectively, in a third exemplary embodiment.

FIGS. 19A, 19B, and 19C are diagrams used to explain correction values that are based on the stacking amount and the presence or absence of sort processing in the third exemplary embodiment.

DESCRIPTION OF THE EMBODIMENTS

Various exemplary embodiments, features, and aspects of the disclosure will be described in detail below with reference to the drawings.

Figure 1:
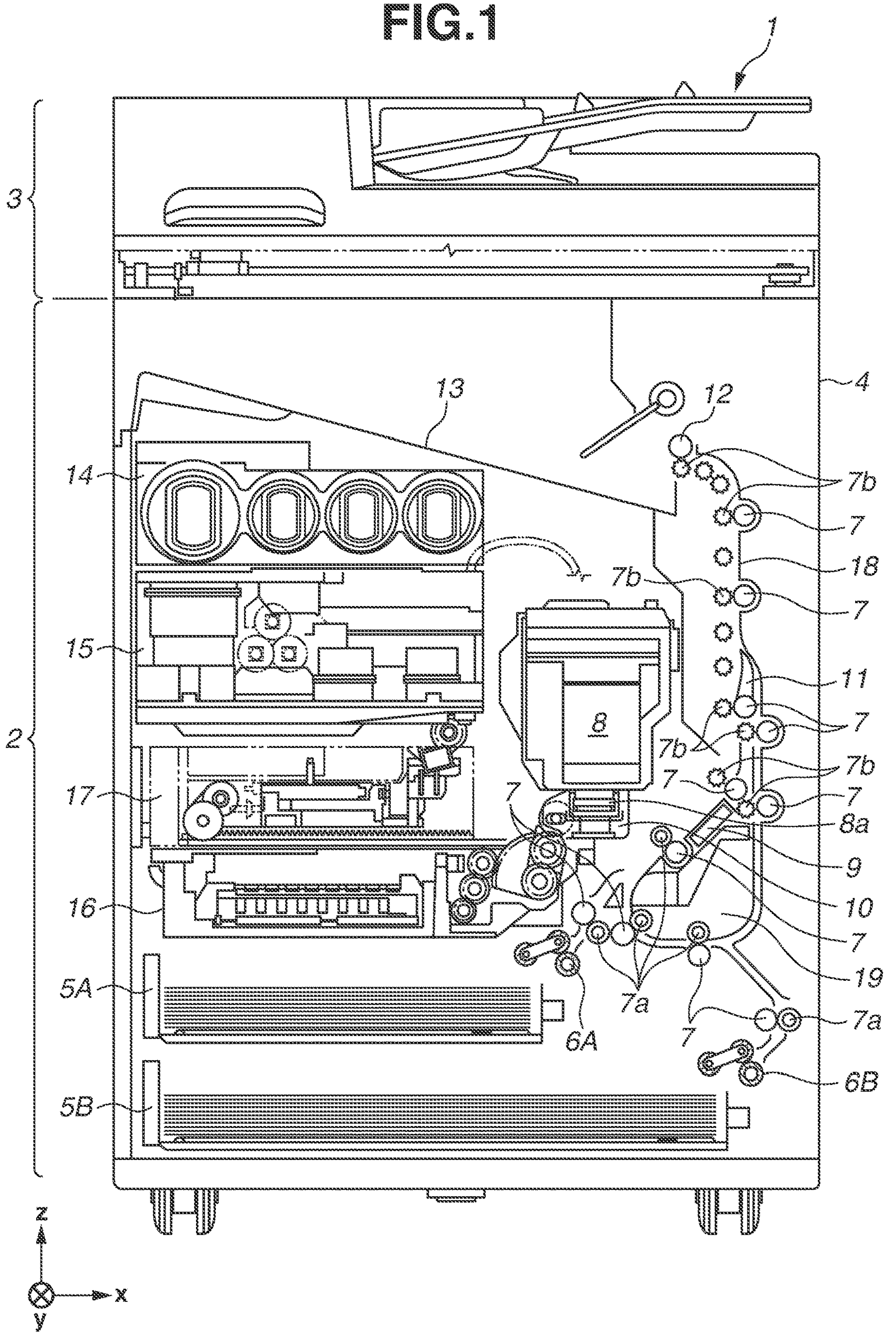
FIG. 1 is a diagram illustrating a recording apparatus according to a first exemplary embodiment when the recording apparatus is in a standby state.

FIG. 1 is an internal configuration diagram of an inkjet recording apparatus 1 (hereinafter referred to as a "recording apparatus 1") which is used in a first exemplary embodiment. In FIG. 1, an x-direction indicates the horizontal direction, a y-direction (a direction perpendicular to the drawing sheet) indicates a direction in which ejection ports are arrayed in a recording head 8 described below, and a z-direction indicates the vertical direction.

The recording apparatus 1 is a multifunction peripheral including a printing section 2 and a scanner section 3, and is able to perform various processing operations concerning a recording operation and a reading operation by causing the printing section 2 and the scanner section 3 to operate on an individual basis or in conjunction with each other. The scanner section 3 includes an automatic document feeder (ADF) and a flatbed scanner (FBS) and is able to perform scanning of a document automatically fed by the ADF and scanning of a document placed by the user on a document positioning plate of the FBS. Furthermore, the first exemplary embodiment is directed to a multifunction peripheral including both the printing section 2 and the scanner section 3, but can be directed to a configuration which does not include the scanner section 3. FIG. 1 illustrates a condition in which the recording apparatus 1 is in a standby state, in which the recording apparatus 1 is performing neither a recording operation nor a reading operation.

In the printing section 2, a first cassette 5A and a second cassette 5B, which are used to store recording media (cut sheets), are detachably mounted at the bottom portion of a casing 4 located lower in the vertical direction.

Relatively small recording media of up to A4 size are flatly stacked and stored in the first cassette 5A and relatively large recording media of up to A3 size are flatly stacked and stored in the second cassette 5B. A first feeding unit 6A, which separates and feeds stored recording media one by one, is mounted near the first cassette 5A. Similarly, a second feeding unit 6B is mounted near the second cassette 5B. When a recording operation is performed, a recording medium S is selectively fed from either one of the cassettes 5A and 5B.

Conveyance rollers 7, a discharge roller 12, pinch rollers 7*a*, spurs 7*b*, a guide 18, an inner guide 19, and a flapper (diverter) 11 constitute a conveyance mechanism (conveyance unit) which guides a recording medium S in a predetermined direction. The conveyance rollers 7 are drive rollers which are located upstream and downstream of the recording head 8 (platen 9) and are driven by a conveyance motor. The pinch rollers 7*a* are driven rollers which rotate while nipping a recording medium S together with the conveyance rollers 7. The discharge roller 12 is a drive roller which is located downstream of the conveyance rollers 7 and is driven by a discharge motor. The spurs 7*b* nip and convey a recording medium S (FIG. 4A) together with the conveyance rollers 7 and the discharge roller 12 located downstream of the recording head 8 (platen 9).

The recording apparatus 1 includes a plurality of motors (see FIG. 8) which is used to drive the above-mentioned drive rollers, and each drive roller is connected to a corresponding one of the plurality of motors. The correspondence relationship between the motors and the drive rollers are described in detail below.

The guide 18 is provided in a conveyance pathway of a recording medium S to guide the recording medium S in a predetermined direction. The inner guide 19, which is a member extending in the y-direction, has a curved side surface and guides a recording medium S along the curved side surface. The flapper 11 is a member for switching a direction in which a recording medium S is conveyed at the time of a double-sided recording operation. A discharge tray 13 (stacking unit) is a tray for stacking thereon recording media S which have been subjected to a recording operation and have been discharged by the discharge roller 12.

The recording head 8 (recording unit) in the first exemplary embodiment is a full line type color inkjet recording head, in which a plurality of ejection ports configured to eject ink based on recording data is arrayed along the y-direction illustrated in FIG. 1 in such a way as to cover a length equivalent to the width of a recording medium S. When the recording head 8 is in a standby position, an ejection port surface 8*a* of the recording head 8 faces vertically down and is capped with a cap unit 10 as illustrated in FIG. 1. When a recording operation is performed, the orientation of the recording head 8 is changed by a print controller 202 (FIG. 2) described below in such a manner that the ejection port surface 8*a* faces the platen 9. The platen 9 is configured with a flat plate extending in the y-direction and supports a recording medium S being subjected to a recording operation by the recording head 8, from the back side of the recording medium S. The movement of the recording head 8 from the standby position to a recording position is described in detail below.

An ink tank unit 14 separately reserves and stores ink of four colors to be supplied to the recording head 8. An ink supply unit 15 is provided in the midstream of a flow path connecting the ink tank unit 14 to the recording head 8 to adjust the pressure and flow rate of ink in the recording head 8 to within respective appropriate ranges. The first exemplary embodiment employs a circulation type ink supply system, in which the ink supply unit 15 adjusts the pressure of ink supplied to the recording head 8 and the flow rate of ink collected from the recording head 8 to within respective appropriate ranges.

A maintenance unit 16 includes the cap unit 10 and a wiping unit 17 and causes them to operate at predetermined timings, thus performing a maintenance operation for the recording head 8. The maintenance operation is described in detail below.

Figure 2:
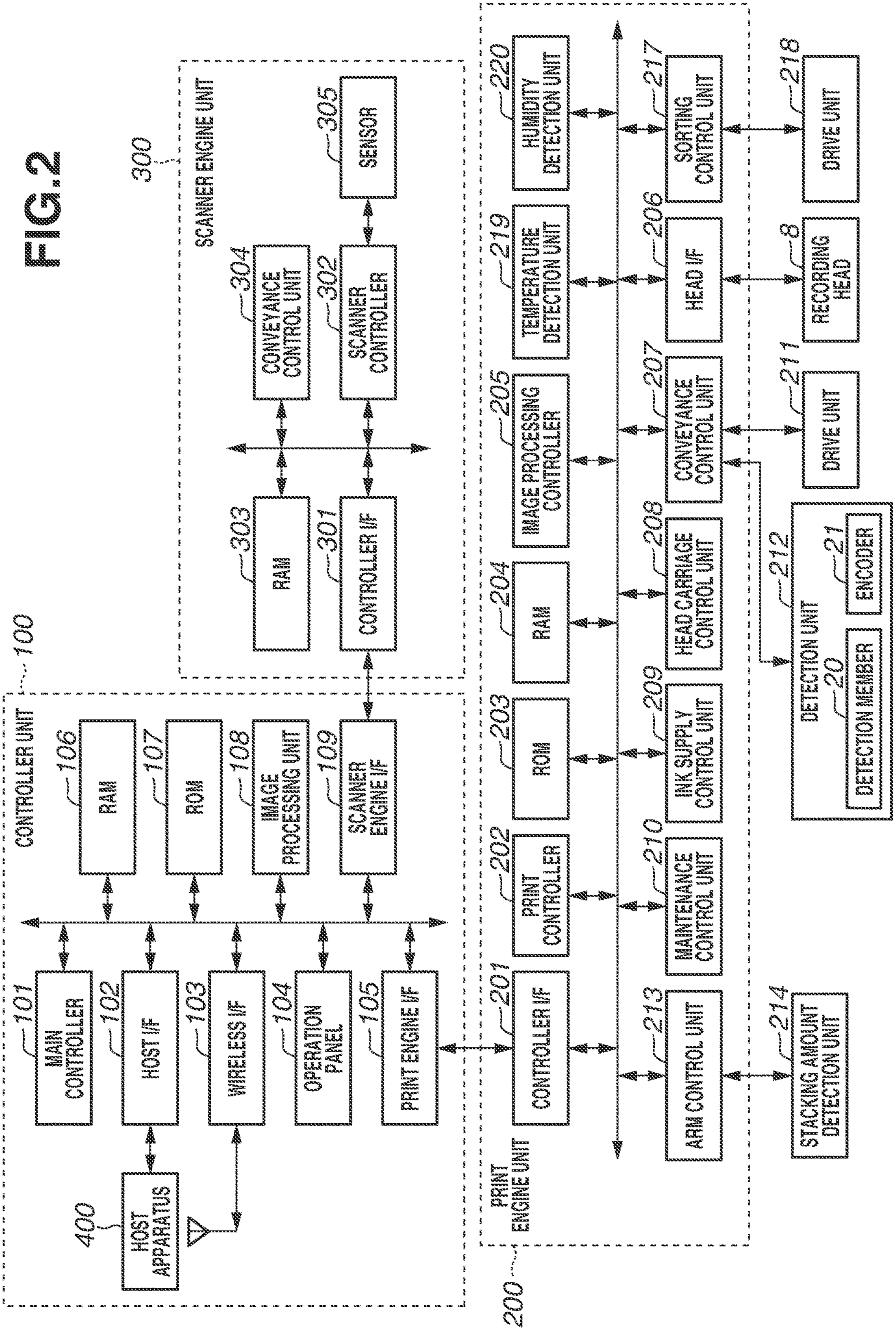
FIG. 2 is a diagram illustrating a control configuration of the recording apparatus according to the first exemplary embodiment.

FIG. 2 is a block diagram illustrating a control configuration in the recording apparatus 1. The control configuration mainly includes a print engine unit 200, which comprehensively controls the printing section 2, a scanner engine unit 300, which comprehensively controls the scanner section 3, and a controller unit 100, which comprehensively controls the entire recording apparatus 1. The print controller 202 controls various mechanisms of the print engine unit 200 according to instructions of a main controller 101 of the controller unit 100. Various mechanisms of the scanner engine unit 300 are controlled by the main controller 101 of the controller unit 100. In the following description, the details of the control configuration are described.

In the controller unit 100, the main controller 101, which is configured with a central processing unit (CPU), controls the entire recording apparatus 1 with a random access memory (RAM) 106 used as a work area according to a program and various parameters stored in a read-only memory (ROM) 107. For example, when a print job is input from a host apparatus 400 via a host interface (I/F) 102 or a wireless I/F 103, an image processing unit 108 performs predetermined image processing on the received image data according to instructions of the main controller 101. Then, the main controller 101 transmits the image data subjected to the image processing to the print engine unit 200 via a print engine I/F 105.

Furthermore, the recording apparatus 1 can acquire image data from the host apparatus 400 via wireless communication or wired communication, or can acquire image data from an external storage device (for example, a Universal Serial Bus (USB) memory) connected to the recording apparatus 1. A communication method used for such a wireless communication or wired communication is not limited. For example, as a communication method used for wireless communication, a method in compliance with wireless technology standards such as Wi-Fi (Wireless Fidelity®) and Bluetooth® can be applied. As a communication method used for wired communication, for example, Universal Serial Bus (USB) can be applied. Moreover, for example, when a reading command is input from the host apparatus 400, the main controller 101 transmits the input reading command to the scanner section 3 via a scanner engine I/F 109.

An operating panel 104 is a mechanism used for the user to perform inputting and outputting with respect to the recording apparatus 1. Via the operating panel 104, the user is able to give instructions for operations, such as copying and scanning, set the print mode, and recognize information about the recording apparatus 1. Moreover, the user is able to set via the operating panel 104 whether to perform sort processing for discharging sheets with the sheets sorted into stacks each having a predetermined number of sheets at the time of copying. Furthermore, in the case of printing that is based on a print job input from the host apparatus 400, setting for sort processing is performed at the host apparatus 400. In the first exemplary embodiment, a copying operation on recording media S performed by the printing section 2 based on information read by the scanner section 3 and a printing operation on recording media S performed by the printing section 2 based on information input from the host apparatus 400 are simply referred to as "recording" as appropriate.

For example, in a case where a copying operation is selected on the operating panel 104 (input panel), a button for setting sort processing (sorting) is displayed as well as buttons for setting the magnification and other settings, and the presence or absence of sort processing is set according to the selection of the button. Moreover, the host apparatus 400 opens a window for printer properties with which detailed settings related to printing can be made. The presence or absence of sort processing to be displayed in the window is set depending on the presence or absence of a check in a checkbox.

Thus, in the first exemplary embodiment, the host apparatus 400 serves as an external apparatus which allows inputting of the setting for sort processing.

In the print engine unit 200, the print controller 202, which is configured with a CPU, controls various mechanisms included in the printing section 2 with a RAM 204 used as a work area according to a program and various parameters stored in a ROM 203. When various commands and image data are received via a controller I/F 201, the print controller 202 temporarily stores them in the RAM 204. The print controller 202 causes an image processing controller 205 to convert the stored image data into recording data in such a manner that the recording head 8 can use the recording data for a recording operation. Upon generation of the recording data, the print controller 202 causes the recording head 8 to perform a recording operation that is based on the recording data via a head I/F 206. At this time, the print controller 202 conveys a recording medium S by driving the feeding units 6A and 6B, conveyance rollers 7, discharge roller 12, and flapper 11 illustrated in FIG. 1 via a conveyance control unit 207.

The conveyance control unit 207 is connected to a detection unit 212, which detects the conveyance state of a recording medium S, and a drive unit 211, which drives a plurality of drive rollers, and controls the conveyance of a recording medium S using the drive unit 211 based on a detection result obtained from the detection unit 212. The detection unit 212 includes a detection member 20, which detects the presence or absence of a recording medium S and an encoder 21, which detects the amount of rotation of the drive rollers.

In the course of the recording medium S being conveyed by the conveyance control unit 207, a recording operation is performed by the recording head 8 according to an instruction of the print controller 202, so that print processing is performed.

A head carriage control unit 208 changes the orientation and position of the recording head 8 according to an operating state of the recording apparatus 1 such as a maintenance state or a recording state thereof. An ink supply control unit 209 controls the ink supply unit 15 in such a manner that the pressure of ink supplied to the recording head 8 falls within an appropriate range. A maintenance control unit 210 controls the operations of the cap unit 10 and the wiping unit 17 in the maintenance unit 16 when a maintenance operation for the recording head 8 is performed.

An arm control unit 213 drives a flapper 91 (FIG. 9A and described below) to control the rotation of an arm 90 (FIG. 9A and described below) and thus moves the arm 90 to a retreat position or a detecting position. The arm control unit 213 is connected to a stacking amount detection unit 214, which detects a stacking amount of recording media S on the discharge tray 13 based on the displacement (rotation) of the arm 90. A sorting control unit 217 controls the movement of a movable tray 13*b* (FIG. 9A and described below), which is a component of the discharge tray 13, via a drive unit 218 to sort recording media S being discharged. A temperature detection unit 219 (temperature detection unit) detects the temperature of the environment in which the recording apparatus 1 is installed (or the temperature inside the recording apparatus 1). Moreover, a humidity detection unit 220 (humidity detection unit) detects the humidity of the environment in which the recording apparatus 1 is installed (or the humidity inside the recording apparatus 1).

In the scanner engine unit 300, the main controller 101 controls hardware resources of the scanner controller 302 with the RAM 106 used as a work area according to a program and various parameters stored in the ROM 107. Accordingly, various mechanisms included in the scanner section 3 are controlled. For example, the main controller 101 controls hardware resources included in the scanner controller 302 via a controller I/F 301 to cause a conveyance control unit 304 to convey a document placed by the user on the ADF and cause a sensor 305 to read the document. Then, the scanner controller 302 stores the read image data in a RAM 303. Furthermore, the print controller 202 is able to convert the image data acquired as mentioned above into recording data, thus enabling the recording head 8 to perform a recording operation that is based on the image data read by the scanner controller 302.

Figure 3:
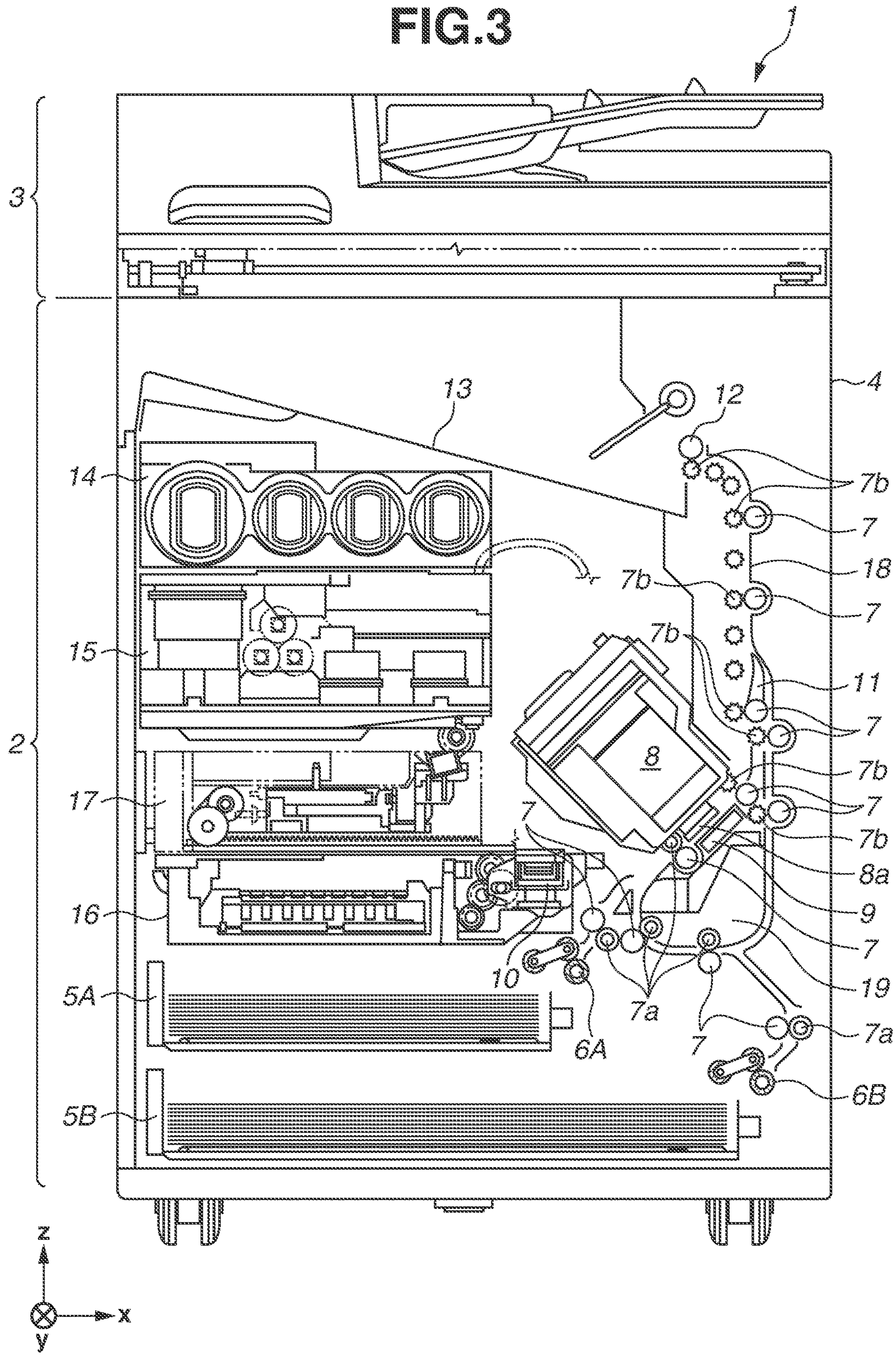
FIG. 3 is a diagram illustrating the recording apparatus according to the first exemplary embodiment when the recording apparatus is in a recording state.

FIG. 3 is a diagram illustrating the recording apparatus 1 when the recording apparatus 1 is in a recording state. As compared with the standby state illustrated in FIG. 1, the cap unit 10 is away from the ejection port surface 8*a* of the recording head 8 and the ejection port surface 8*a* faces the platen 9. In the first exemplary embodiment, the plane of the platen 9 is inclined about 45 degrees with respect to the horizontal direction, and the ejection port surface 8*a* of the recording head 8 in a recording position is also inclined about 45 degrees with respect to the horizontal direction in such a way as to keep a distance between the ejection port surface 8*a* and the platen 9 constant.

When moving the recording head 8 from the standby position illustrated in FIG. 1 to the recording position illustrated in FIG. 3, the print controller 202 uses the maintenance control unit 210 to move the cap unit 10 down to a retreat position illustrated in FIG. 3. Accordingly, the ejection port surface 8*a* of the recording head 8 moves away from the cap unit 10. Then, the print controller 202 uses the head carriage control unit 208 to turn the recording head 8 by 45 degrees while adjusting the height of the recording head 8 in the vertical direction, thus causing the ejection port surface 8*a* to face the platen 9. Upon completion of the recording operation, to move the recording head 8 from the recording position to the standby position, the print controller 202 performs the reverse of the above-described process.

Next, a conveyance pathway of a recording medium S in the printing section 2 is described. When a recording command is input, the print controller 202 first uses the maintenance control unit 210 and the head carriage control unit 208 to move the recording head 8 to the recording position illustrated in FIG. 3. Then, the print controller 202 uses the conveyance control unit 207 to drive either the first feeding unit 6A or the second feeding unit 6B according to the recording command, thus feeding a recording medium S.

Figure 4C:
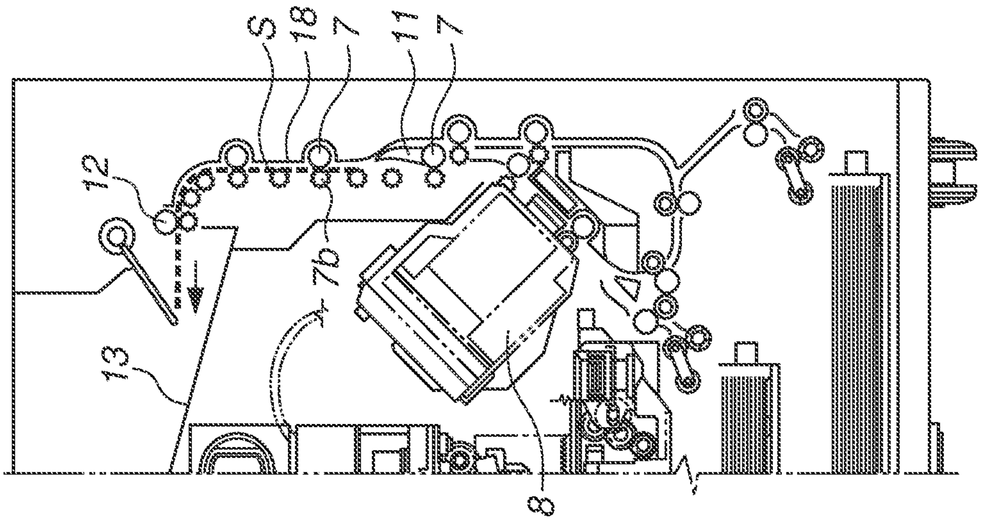
FIGS. 4A, 4B, and 4C are diagrams each illustrating a conveyance pathway of a recording medium fed from a first cassette in the first exemplary embodiment.
Figure 4B:
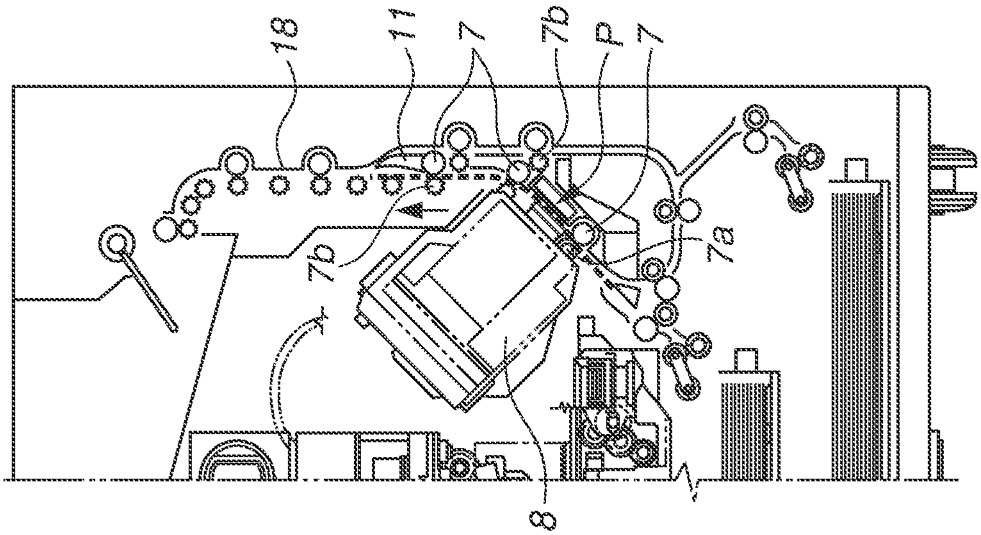
Figure 4A:
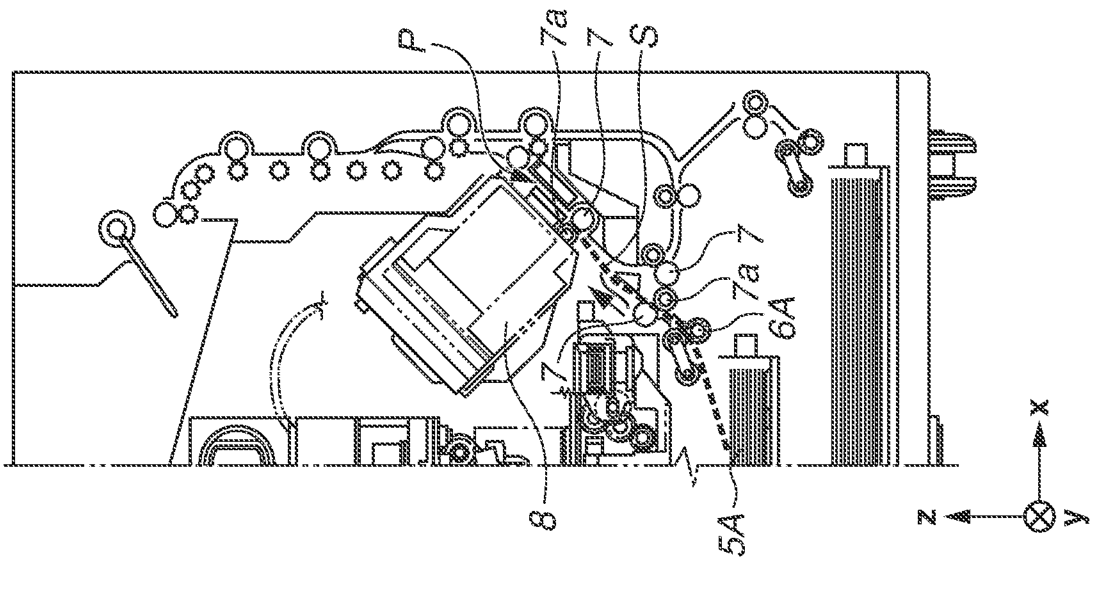

FIGS. 4A, 4B, and 4C are diagrams illustrating a conveyance pathway in the case of an A4 size recording medium S stored in the first cassette 5A being conveyed. A recording medium S stacked uppermost inside the first cassette 5A is separated from the second uppermost and subsequent recording media by the first feeding unit 6A and is then conveyed toward a recording area P between the platen 9 and the recording head 8 while being nipped between the conveyance rollers 7 and the pinch rollers 7*a*. FIG. 4A illustrates a conveyance state obtained immediately before the leading edge of the recording medium S arrives at the recording area P. The direction of movement of the recording medium S is changed from the horizontal direction (x-direction) to a direction inclined about 45 degrees with respect to the horizontal direction during a period in which the recording medium S is fed by the first feeding unit 6A to arrive at the recording area P.

In the recording area P, ink is ejected from a plurality of ejection ports provided in the recording head 8 toward the recording medium S. In an area in which ink is applied to the recording medium S, the back side of the recording medium S is supported by the platen 9 so as to keep a distance between the ejection port surface 8*a* and the recording medium S constant. After ink is applied to the recording medium S, the recording medium S is guided by the conveyance rollers 7 and the spurs 7*b* in such a manner that the recording medium S passes on the left side of the flapper 11, a tip of which is inclined to the right, and is conveyed along the guide 18 in the vertically upward direction of the recording apparatus 1. FIG. 4B illustrates a state in which the leading edge of the recording medium S has passed through the recording area P and the recording medium S is being conveyed vertically upward. The direction of movement of the recording medium S is changed by the conveyance rollers 7 and the spurs 7*b* from the direction inclined about 45 degrees with respect to the horizontal direction in the recording area P to the vertically upward direction.

After being conveyed vertically upward, the recording medium S is discharged onto the discharge tray 13 by the discharge roller 12 and the spurs 7*b*. FIG. 4C illustrates a state in which the leading edge of the recording medium S has passed through the discharge roller 12 and the recording medium S is being discharged onto the discharge tray 13. The discharged recording medium S is held on the discharge tray 13 with the side thereof on which an image has been recorded by the recording head 8 face-down.

Figure 5C:
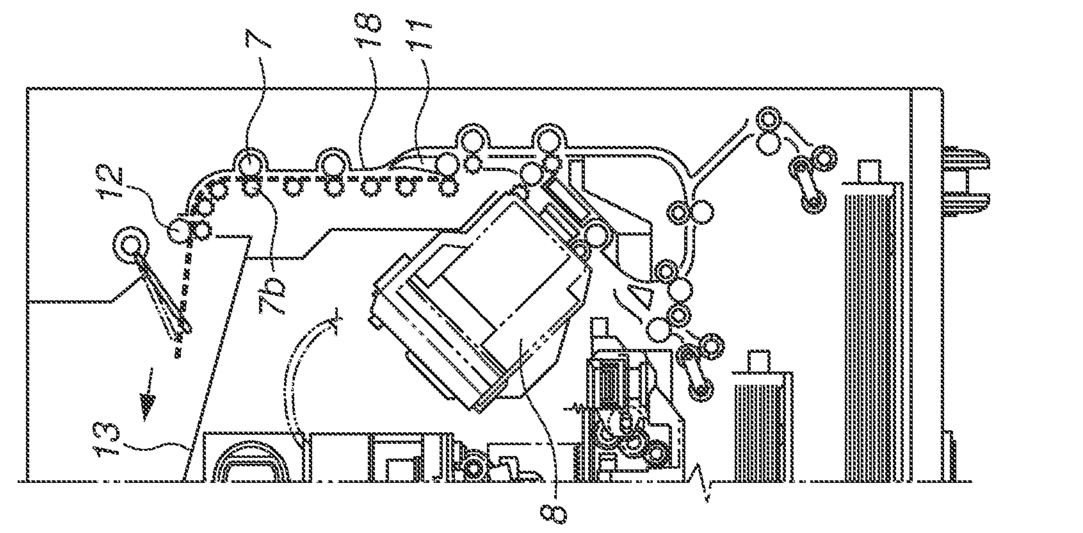
FIGS. 5A, 5B, and 5C are diagrams each illustrating a conveyance pathway of a recording medium fed from a second cassette in the first exemplary embodiment.
Figure 5B:
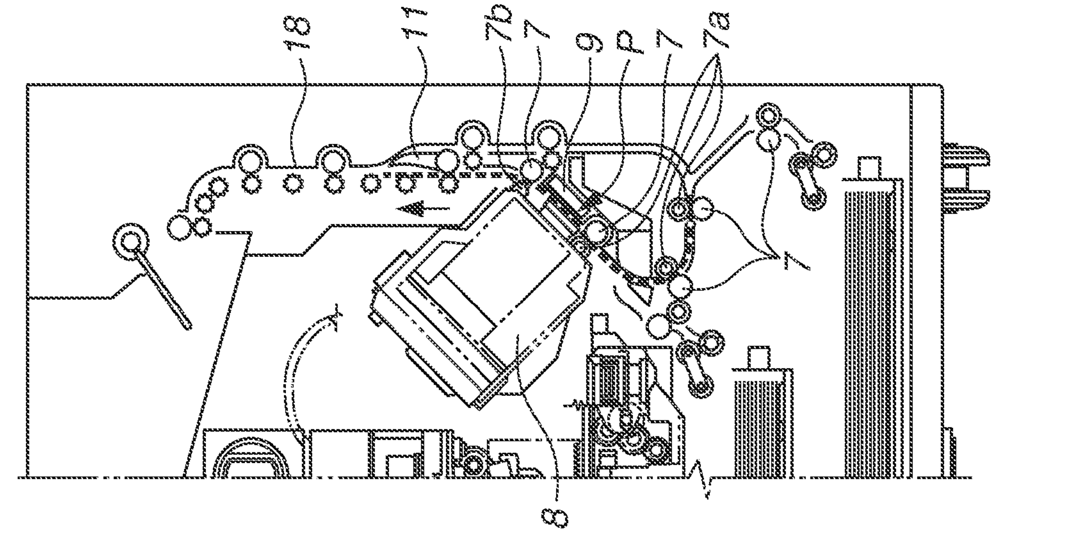
Figure 5A:
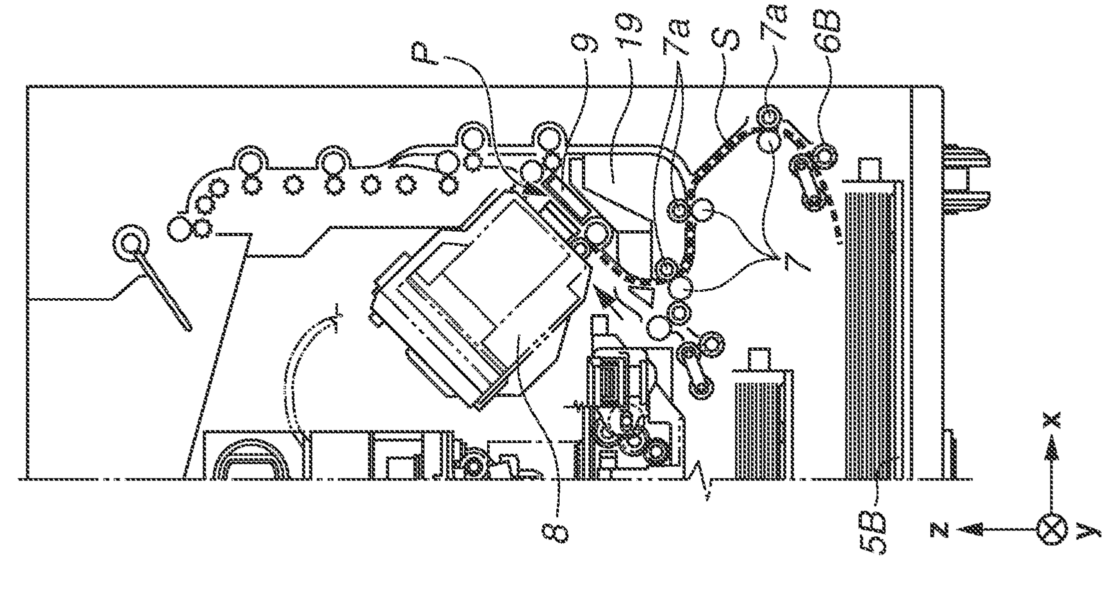

FIGS. 5A, 5B, and 5C are diagrams illustrating a conveyance pathway in the case of an A3 size recording medium S stored in the second cassette 5B being fed. A recording medium S stacked uppermost inside the second cassette 5B is separated from the second uppermost and subsequent recording media by the second feeding unit 6B and is then conveyed toward the recording area P between the platen 9 and the recording head 8 while being nipped between the conveyance rollers 7 and the pinch rollers 7*a*.

FIG. 5A illustrates a conveyance state obtained immediately before the leading edge of the recording medium S arrives at the recording area P. In a part of the conveyance pathway through which the recording medium S is fed by the second feeding unit 6B and then arrives at the recording area P, the conveyance rollers 7, the pinch rollers 7*a*, and the inner guide 19 are provided in such a manner that the recording medium S is conveyed to the platen 9 while being bent into an S-shape.

A subsequent part of the conveyance pathway is similar to that in the case of an A4 size recording medium S illustrated in FIGS. 4B and 4C. FIG. 5B illustrates a state in which the leading edge of the recording medium S has passed through the recording area P and the recording medium S is being conveyed vertically upward. FIG. 5C illustrates a state in which the leading edge of the recording medium S has passed through the discharge roller 12 and the recording medium S is being discharged onto the discharge tray 13.

FIGS. 6A, 6B, 6C, and 6D illustrate a conveyance pathway in the case of a recording operation (duplex recording) being performed for the back side (second surface) of an A4 size recording medium S. In the case of duplex recording being performed, a recording operation is first performed for the first surface (front side) and is then performed for the second surface (back side). A conveyance process performed during a recording operation for the first surface is similar to that illustrated in FIGS. 4A to 4C and, therefore, the description thereof is omitted. In the following description, a conveyance process subsequent to that illustrated in FIG. 4C is described.

Figure 6D:
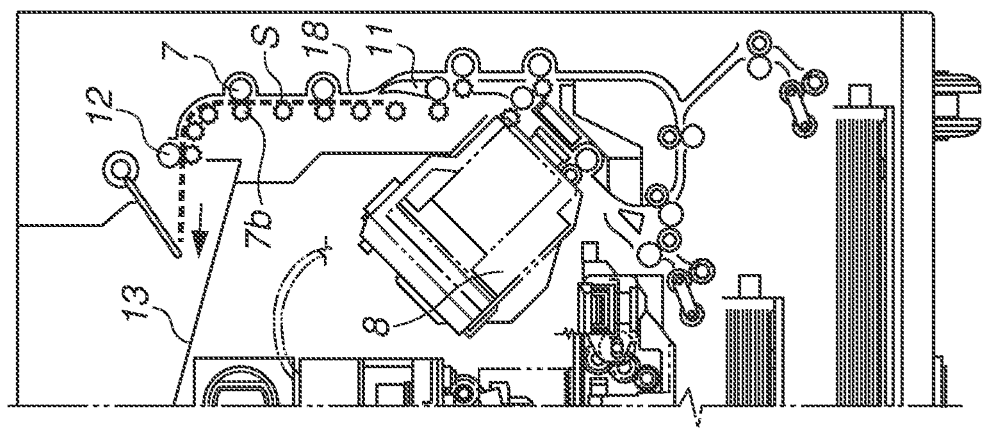
FIGS. 6A, 6B, 6C, and 6D are diagrams each illustrating a conveyance pathway of a recording medium in a case where a recording operation is performed on the back surface of the recording medium in the first exemplary embodiment.
Figure 6C:
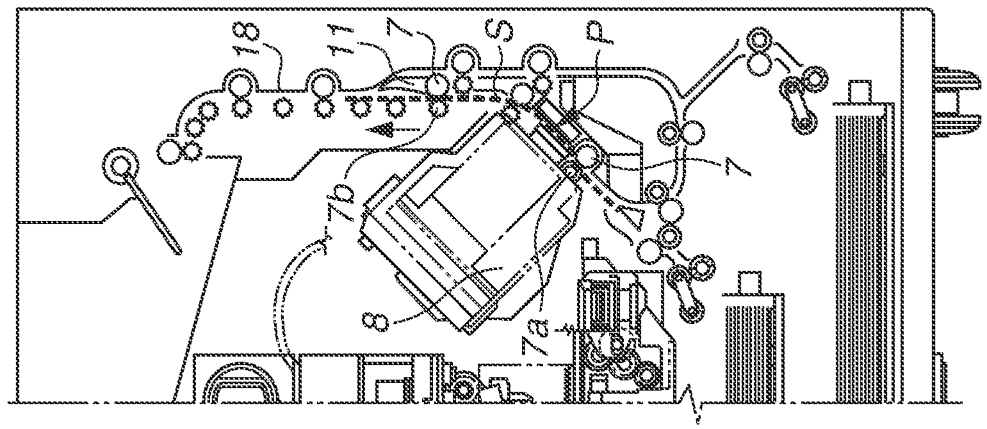
Figure 6B:
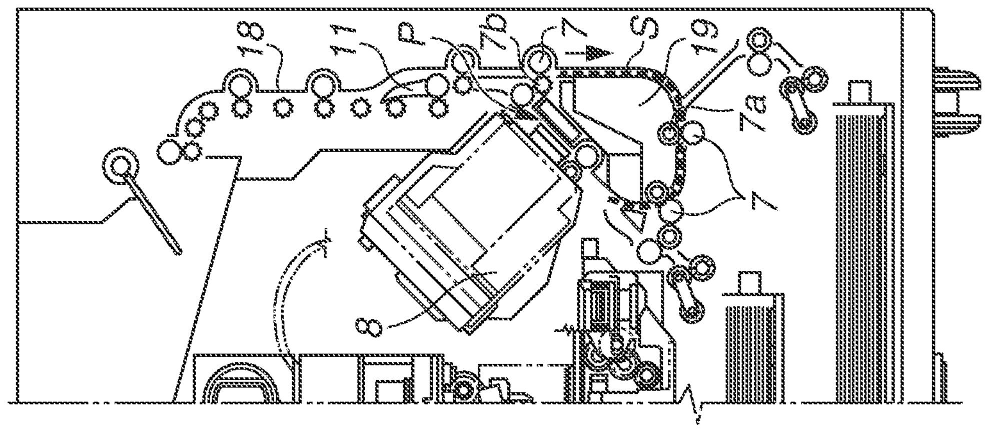
Figure 6A:
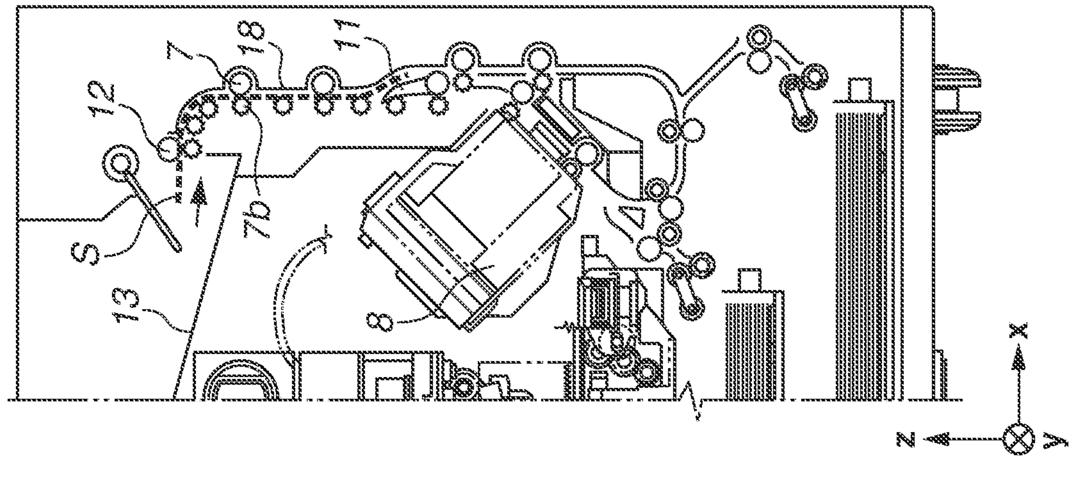

After a recording operation for the first surface by the recording head 8 is completed and the trailing edge of the recording medium S passes by the flapper 11, the print controller 202 causes the conveyance rollers 7 to rotate backward, thus conveying the recording medium S to the inside of the recording apparatus 1. At this time, since the flapper 11 is controlled by an actuator (not illustrated) in such a manner that the tip of the flapper 11 is inclined to the left side, the leading edge of the recording medium S (corresponding to the trailing edge during the recording operation for the first surface) passes on the right side of the flapper 11 and the recording medium S is conveyed vertically downward. FIG. 6A illustrates a state in which the leading edge of the recording medium S (corresponding to the trailing edge during the recording operation for the first surface) is passing on the right side of the flapper 11.

After that, the recording medium S is conveyed along the curved outer surface of the inner guide 19 and is then conveyed again to the recording area P between the recording head 8 and the platen 9. At this time, the second surface of the recording medium S faces the ejection port surface 8*a* of the recording head 8. FIG. 6B illustrates a conveyance state obtained immediately before the leading edge of the recording medium S arrives at the recording area P for a recording operation for the second surface.

A subsequent part of the conveyance pathway is similar to that in the case of the recording operation for the first surface illustrated in FIGS. 4B and 4C. FIG. 6C illustrates a state in which the leading edge of the recording medium S has passed through the recording area P and the recording medium S is being conveyed vertically upward. At this time, the flapper 11 is controlled by the actuator (not illustrated) in such a manner that the tip of the flapper 11 is inclined to the right side. FIG. 6D illustrates a state in which the leading edge of the recording medium S has passed through the discharge roller 12 and the recording medium S is being discharged onto the discharge tray 13.

Next, a maintenance operation for the recording head 8 is described. As also described with reference to FIG. 1, the maintenance unit 16 in the first exemplary embodiment includes the cap unit 10 and the wiping unit 17 and causes them to operate at predetermined timings to perform a maintenance operation.

Figure 7:
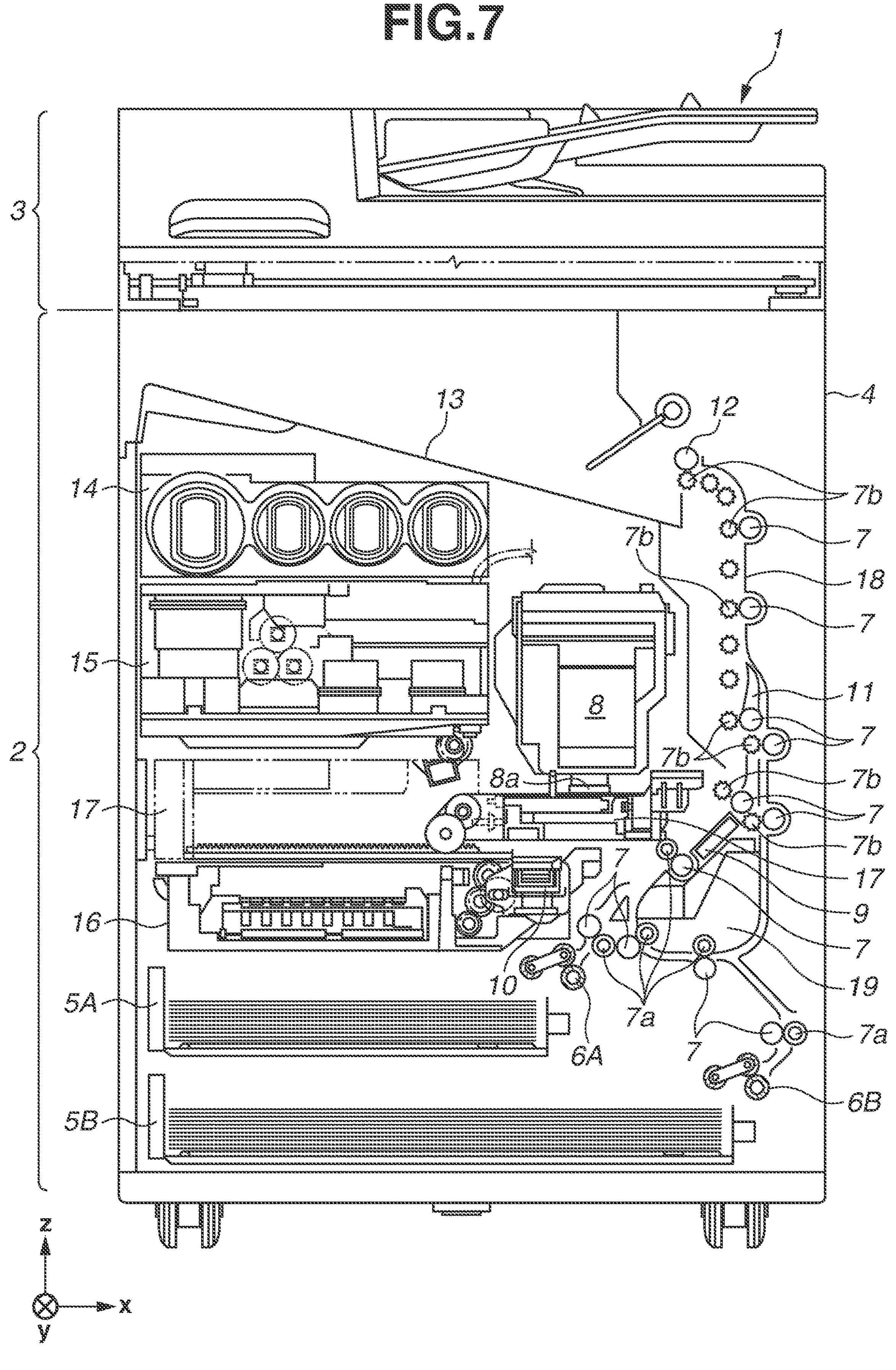
FIG. 7 is a diagram illustrating the recording apparatus according to the first exemplary embodiment when the recording apparatus is in a maintenance state.

FIG. 7 is a diagram illustrating the recording apparatus 1 when the recording apparatus 1 is in a maintenance state. In the case of moving the recording head 8 from the standby position illustrated in FIG. 1 to a maintenance position illustrated in FIG. 7, the print controller 202 causes the recording head 8 to move vertically upward and causes the cap unit 10 to move vertically downward. Then, the print controller 202 causes the wiping unit 17 to move from the retreat position to the right as viewed in FIG. 7. After that, the print controller 202 causes the recording head 8 to move vertically downward to the maintenance position, in which a maintenance operation is able to be performed.

On the other hand, in the case of moving the recording head 8 from the recording position illustrated in FIG. 3 to the maintenance position illustrated in FIG. 7, the print controller 202 causes the recording head 8 to move vertically upward while turning the recording head 8 by 45 degrees. Then, the print controller 202 causes the wiping unit 17 to move from the retreat position to the right. After that, the print controller 202 causes the recording head 8 to move vertically downward to the maintenance position, in which a maintenance operation is able to be performed by the maintenance unit 16.

Figure 8:
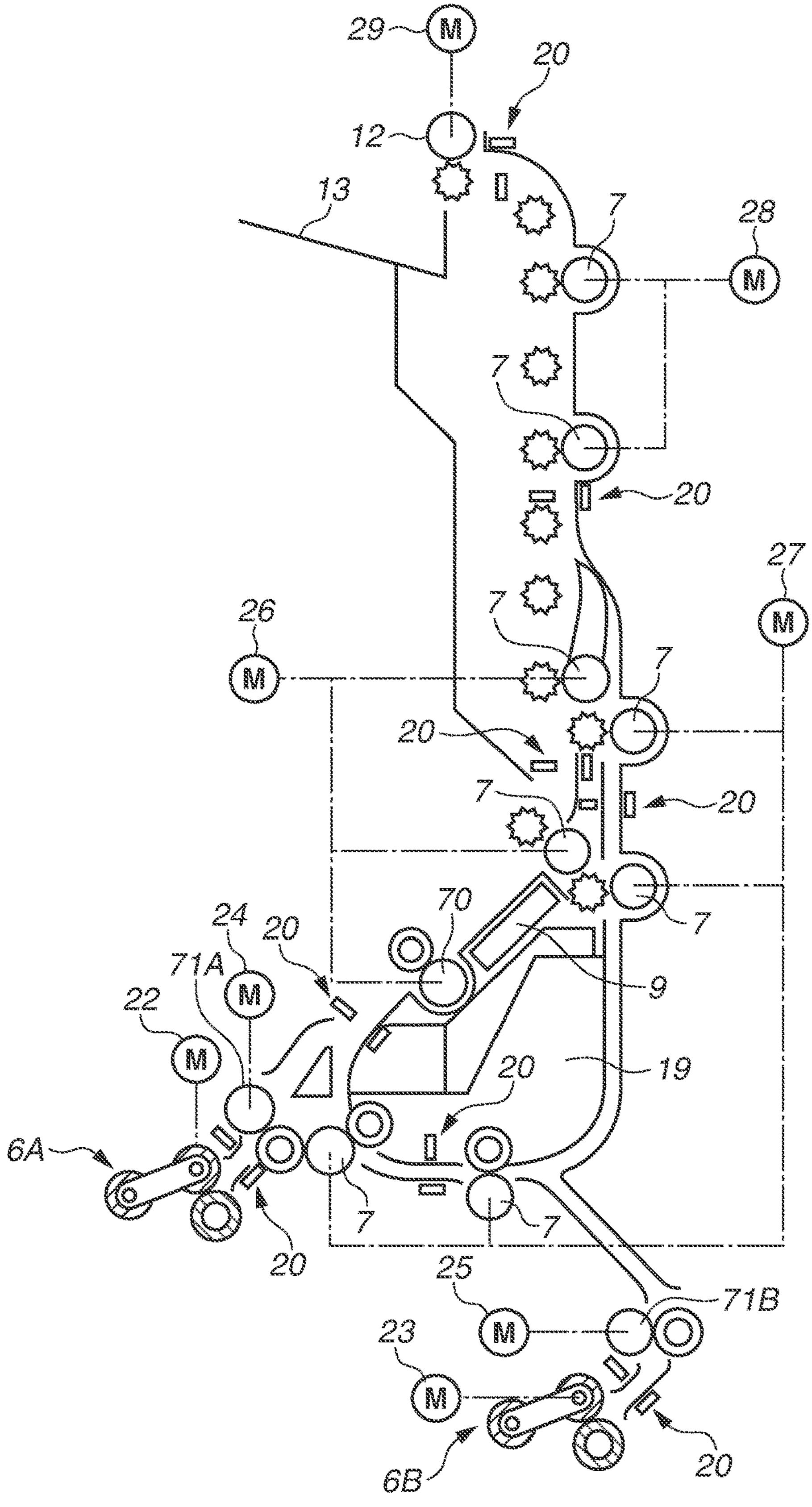
FIG. 8 is a diagram illustrating a correspondence relationship between drive rollers and motors in the first exemplary embodiment.

FIG. 8 is a diagram illustrating a correspondence relationship between a plurality of motors and a plurality of drive rollers in the recording apparatus 1. A first feeding motor 22 drives the first feeding unit 6A, which feeds a recording medium S from the first cassette 5A. A second feeding motor 23 drives the second feeding unit 6B, which feeds a recording medium S from the second cassette 5B. A first conveyance motor 24 drives a first intermediate roller 71A, which first conveys a recording medium S fed by the first feeding unit 6A. A second conveyance motor 25 drives a second intermediate roller 71B, which first conveys a recording medium S fed by the second feeding unit 6B.

A main conveyance motor 26 drives a main conveyance roller 70, which is located upstream of the platen 9 and mainly conveys a recording medium S being subjected to recording. Moreover, the main conveyance motor 26 also drives two conveyance rollers 7 which are located downstream of the platen 9 and further convey a recording medium S conveyed by the main conveyance roller 70 toward the downstream side.

A third conveyance motor 27 drives two conveyance rollers 7 which convey downward a recording medium S with the first surface thereof subjected to recording. Moreover, the third conveyance motor 27 also drives two conveyance rollers 7 which are located along the inner guide 19 and convey, toward the recording head 8, a recording medium S fed from the second cassette 5B and conveyed by the second intermediate roller 71B or a recording medium S with the first surface thereof subjected to recording and with the front and back sides thereof reversed.

A fourth conveyance motor 28 drives two conveyance rollers 7 which convey upward or downward a recording medium S subjected to a recording operation. A discharge motor 29 drives the discharge roller 12, which discharges a recording medium S subjected to recording to the discharge tray 13. In this way, each of the two feeding motors 22 and 23, five conveyance motors 24 to 28, and discharge motor 29 is associated with one or more drive rollers.

Furthermore, at eight portions along the conveyance pathway, there are located detection members 20 for detecting the presence or absence of a recording medium S. Each detection member 20 is configured with a sensor and a mirror located on both sides of the conveyance pathway, such that the sensor, which includes a light emitting portion and a light receiving portion, is located on one side of the conveyance pathway and the mirror is located at a position on the other side of the conveyance pathway and facing the sensor. The light emitted from the light emitting portion of the sensor is reflected by the mirror, and the presence or absence of a recording medium S, i.e., whether the leading edge or the trailing edge of a recording medium S has passed, is determined based on whether the light receiving portion detects the reflected light.

The conveyance control unit 207 drives the feeding motors 22 and 23, the conveyance motors 24 to 28, and the discharge motor 29 separately to control a conveyance operation of the entire recording apparatus 1, based on detection results output from the respective detection members 20 and output values of the encoders each of which detects the amount of rotation of the associated drive roller.

Figure 9A:
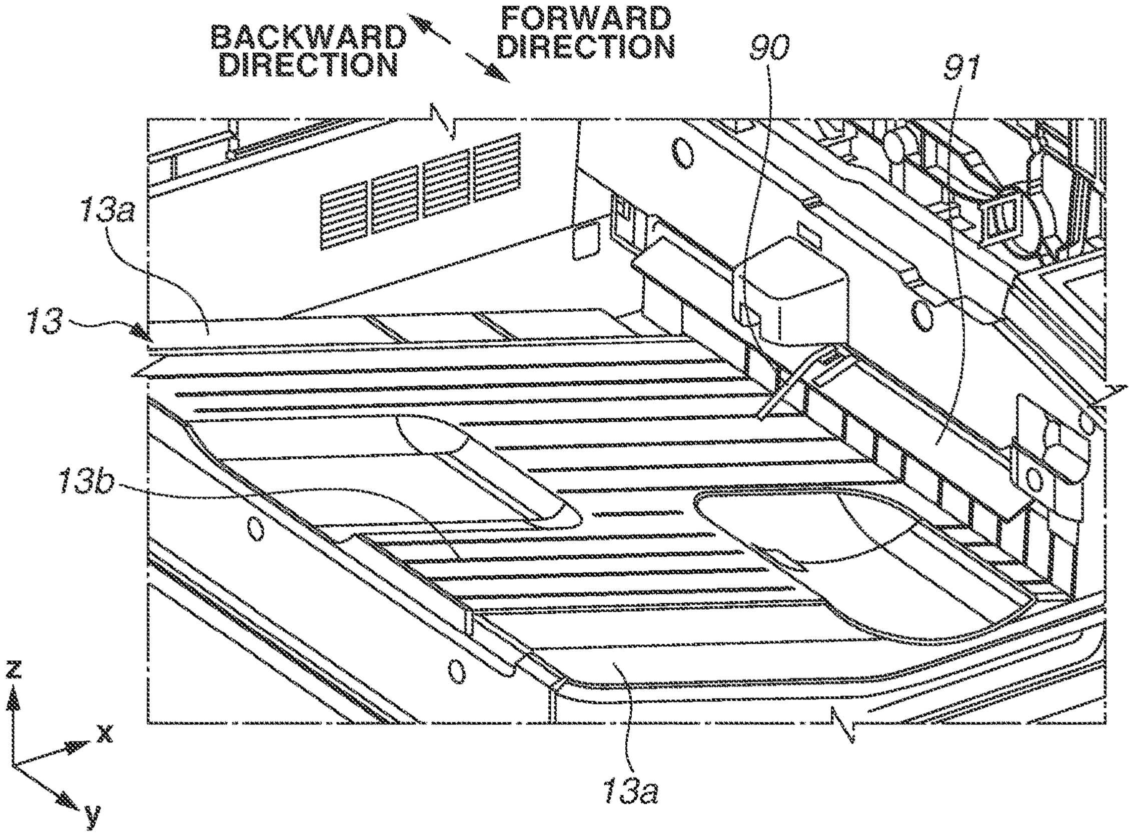
FIGS. 9A and 9B are diagrams illustrating a schematic configuration of a discharge tray and a movement mechanism of a movable tray, respectively, in the first exemplary embodiment.
Figure 9B:
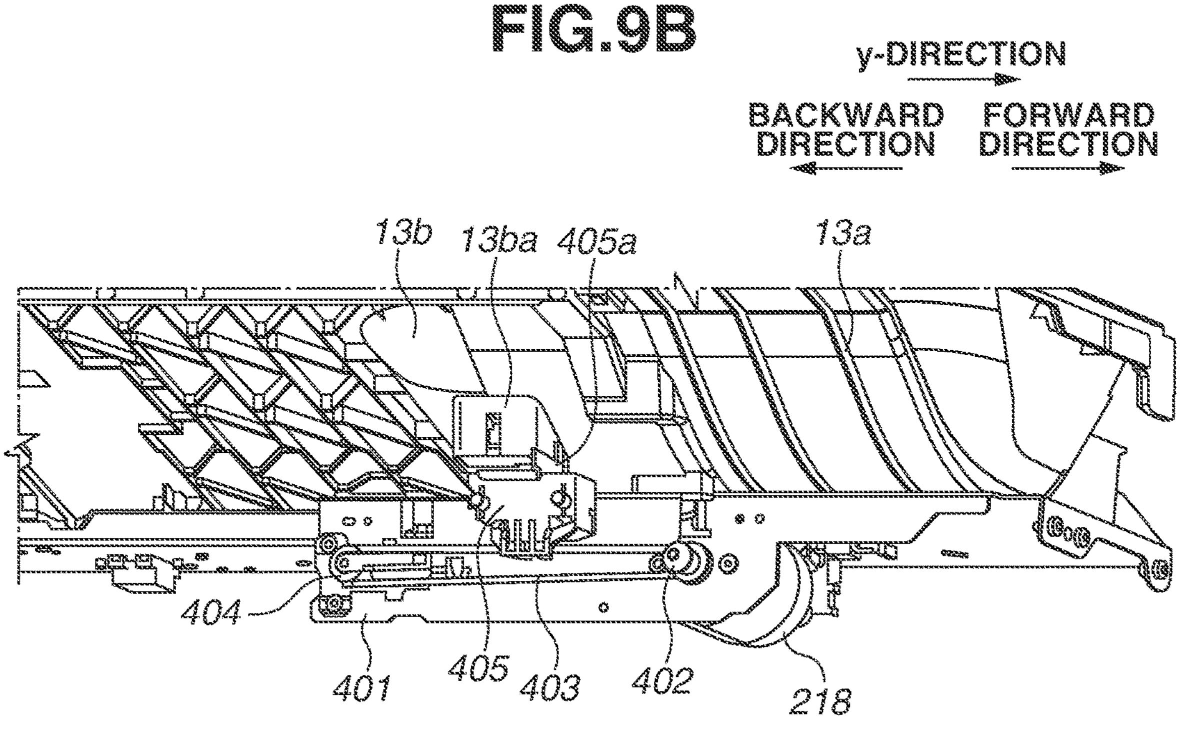

Next, a configuration of the discharge tray 13 is described. FIG. 9A is a schematic perspective configuration diagram of the discharge tray 13 in the recording apparatus 1. FIG. 9B is a schematic configuration diagram illustrating a movement mechanism for the movable tray 13*b* in the discharge tray 13.

The discharge tray 13 (stacking unit) has a slanted surface which is formed to be slanted relative to a recording medium S being discharged, and recording media S are to be stacked on the slanted surface. The discharge tray 13 includes fixed trays 13*a*, which are fixedly mounted to a frame serving as a framework of the recording apparatus 1, and a movable tray 13*b*, which is mounted to be movable in the y-direction (a direction perpendicular to the direction in which a recording medium S is discharged) on the fixed trays 13*a*, as illustrated in FIG. 9A. In the discharge tray 13, the fixed trays 13*a* are located at both ends of the discharge tray 13 in the y-direction, and the movable tray 13*b* is located at the center portion of the discharge tray 13 in the y-direction. With this structure, recording media S discharged onto the discharge tray 13 are to be stacked mainly on the movable tray 13*b*. In the discharge tray 13, for example, when a predetermined number of recording media S are discharged based on an instruction input by the user, the movable tray 13*b* is moved in the forward direction or backward direction along the y-direction, so that the recording media S are sorted into stacks each being a predetermined number of recording media.

The movable tray 13*b* (movable portion) is configured to be movable in the forward direction and backward direction along the y-direction via a movement mechanism with respect to the fixed trays 13*a*, as illustrated in FIG. 9B. The fixed trays 13*a* have a base member 401 extending in the y-direction, on the back surface thereof (a surface opposite to the surface on which recording media S are to be stacked). In the base member 401, the drive unit 218, such as a motor, which is driven under the control of the sorting control unit 217, is mounted. Moreover, in the base member 401, a pulley 402, which rotates by being driven by the drive unit 218, and an idler pulley 404, between which and the pulley 402 an endless belt 403 is suspended in a tensioned manner. The belt 403, which is suspended in a tensioned manner between the pulley 402 and the idler pulley 404, extends in the y-direction. A driving force transmission unit 405 is fixedly mounted to the belt 403. The driving force transmission unit 405 includes a coupling portion 405*a*, which is coupled to a coupling portion 13*ba* mounted on the back surface of the movable tray 13*b*.

Accordingly, the belt 403 being rotated by the drive unit 218 moves the driving force transmission unit 405 in the forward direction and backward direction along the y-direction. This movement of the driving force transmission unit 405 causes the movable tray 13*b*, which is coupled to the driving force transmission unit 405 via the coupling portions 405*a* and 13*ba*, to move in the y-direction. Thus, the driving force of the drive unit 218 is transmitted to the movable tray 13*b* via the belt 403 and other parts, and the transmitted driving force moves the movable tray 13*b* in the forward direction and backward direction along the y-direction.

<Curling of Recording Medium>

Figure 10A:
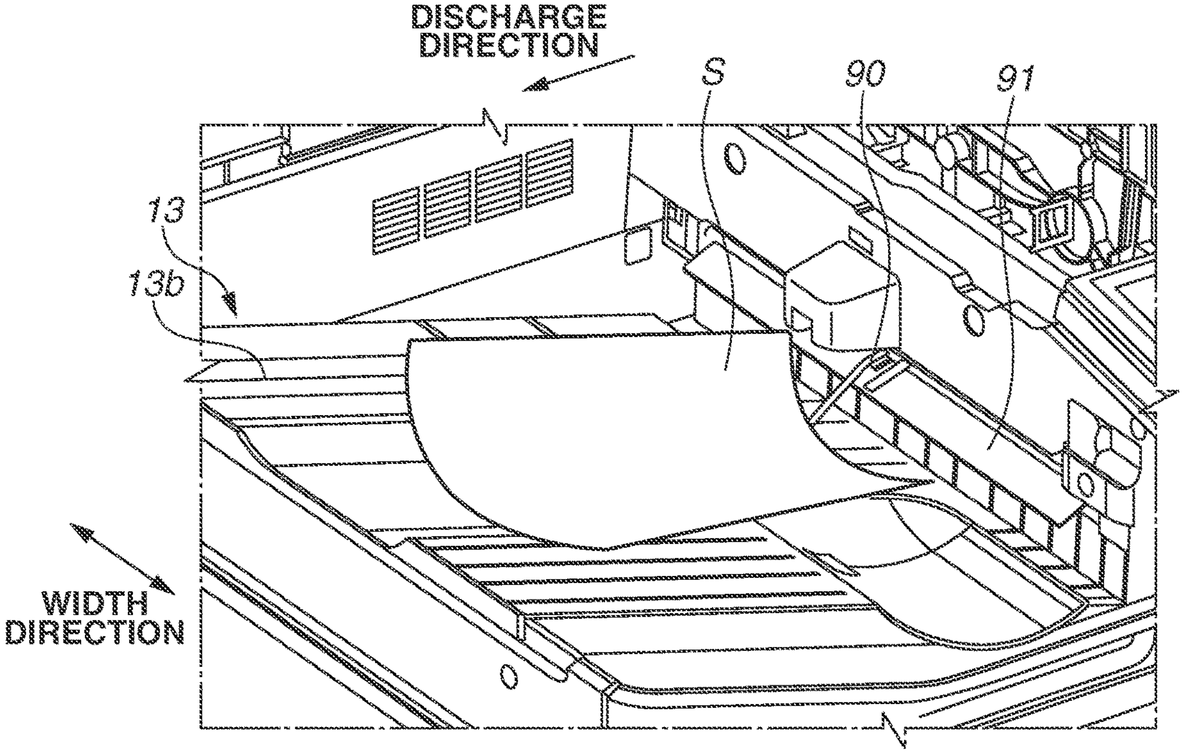
FIGS. 10A and 10B are diagrams used to explain the occurrence of curling.
Figure 10B:
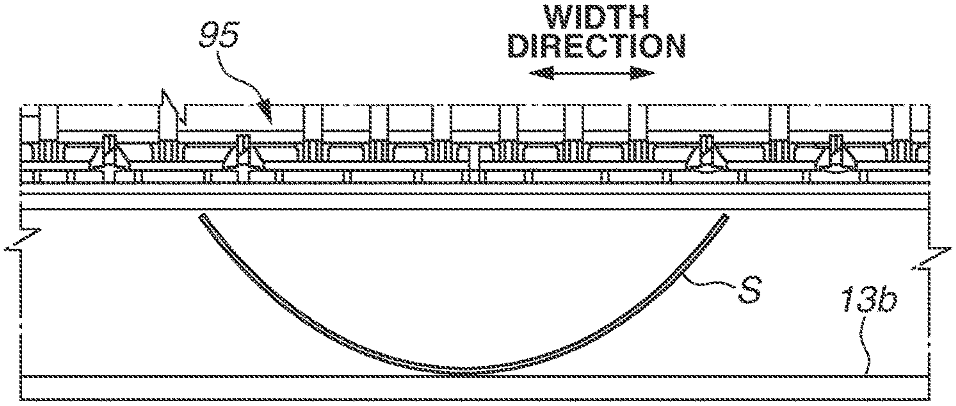

Here, curling of a recording medium S caused by recording is described. In a case where a sheet of recording paper is used as a recording medium, curling caused by ink ejected from the recording head 8 differs depending on the paper grain direction of the sheet. FIG. 10A is a diagram illustrating the state of curling occurring when, in a case where the paper grain of a recording medium S is a longitudinal grain, which has a direction parallel to the discharge direction (conveyance direction) of the recording medium S, a recording medium S to the entire recording surface of which ink has been uniformly applied by the recording apparatus 1 has been discharged onto the discharge tray 13 without curling of the recording medium S being prevented or reduced. FIG. 10B is a diagram illustrating the recording medium S discharged onto the discharge tray 13 in FIG. 10A as viewed from the downstream side toward the upstream side in the discharge direction. FIG. 10B is a sectional view of portions near a discharge opening 95. Furthermore, in the recording apparatus 1, face-down discharge, in which a recording medium S is discharged with the recording surface thereof facing down, is employed.

In a case where the paper grain direction is a direction parallel to the discharge direction, application of ink causes curling at both edge portions of a recording medium S in the width direction thereof, which intersects with the discharge direction of the recording medium S, so that such both edge portions curl up from the discharge tray 13 (movable tray 13*b*), as illustrated in FIG. 10A. Moreover, although not illustrated, in a case where the paper grain direction is a transverse grain direction, which intersects with the discharge direction, curling occurs at both edge portions of a recording medium S in the discharge direction thereof, so that such both edge portions curl up from the discharge tray 13 (movable tray 13*b*). Then, the area of contact between the recording medium S and the discharge tray 13 becomes small, so that the recording medium S is unstable. If the recording medium S is in an unstable state, the position of the recording medium S on the discharge tray 13 becomes likely to deviate, so that recording media S may become unable to be stacked orderly.

The first exemplary embodiment is configured to, in recording processing for performing recording on a recording medium S, determine curling prevention or reduction processing (prevention or reduction processing) based on the amount of application of ink (ink application amount) in a region determined according to the paper grain direction of the recording medium S. Specifically, the first exemplary embodiment is configured to determine curling prevention or reduction processing (including the necessity thereof) by comparing a monitored value calculated based on the amount of application of ink with threshold values.

In the following description, acquisition of the monitored value is described. Furthermore, in the following description, the recording medium S is assumed to be paper unless otherwise specified. Moreover, acquisition of a correction value and acquisition of a monitored value that is based on the correction value are performed by the print controller 202. Thus, in the first exemplary embodiment, the print controller 202 functions as an acquisition unit configured to acquire a correction value and a monitored value.

<Acquisition of Correction Value that is based on Ink Application Amount>

Figures 11A, 11B:
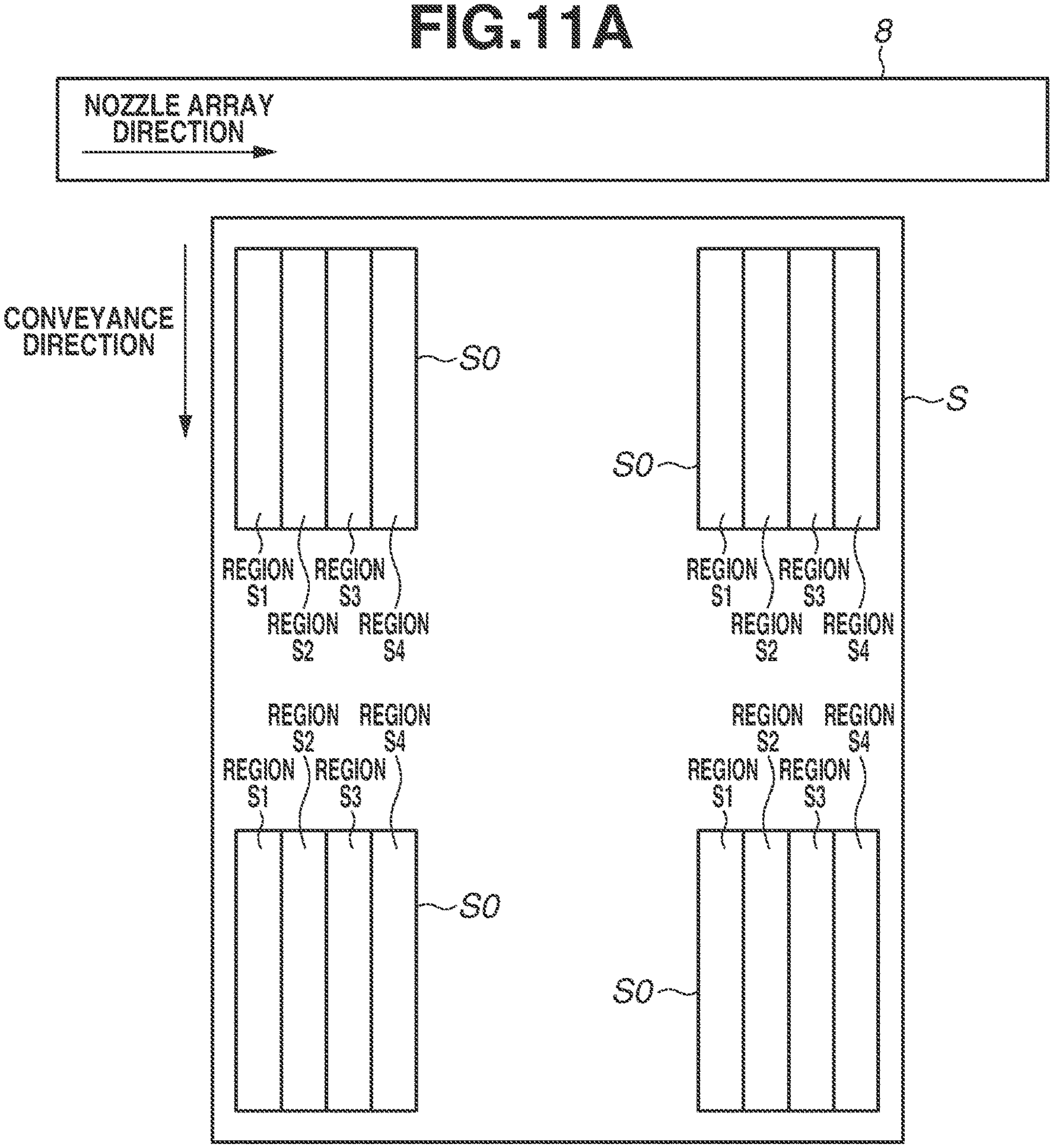
FIGS. 11A and 11B are diagrams illustrating regions which are to be set in the case of a sheet of longitudinal grain paper being conveyed in the first exemplary embodiment.

FIG. 11A is a diagram illustrating predetermined regions S0 targeted for calculating an ink application amount in a case where the paper grain direction is a direction parallel to the conveyance direction (i.e., a longitudinal grain direction), and FIG. 11B is a table showing weighting coefficients set for respective regions included in each predetermined region S0.

In a recording medium S such as recording paper, even if the amount of applied ink is the same, the degree of curling (the amount of curling, in other words, the amount of curling up from the movable tray 13*b* in the first exemplary embodiment) differs depending on recording positions in the recording medium S. Specifically, the closer to an edge of the recording medium S the area for recording is, the more conspicuously curling occurs. Accordingly, the first exemplary embodiment is configured to calculate the ink application amount (the amount of applied ink or the rate of ink) for the predetermined region S0 at each of the four corners of the recording medium S, and acquire a correction value based on a calculation result for the predetermined region S0 largest in ink application amount among the four predetermined regions S0. Furthermore, calculation of the ink application amounts for the four predetermined regions S0 is performed by the print controller 202. Thus, in the first exemplary embodiment, the print controller 202 functions as a calculation unit configured to calculate the ink application amount.

In the case of the longitudinal grain direction, since both edge portions in the width direction are regions having a great influence on curling, the shape of the predetermined region S0 is set in such a manner that the sides thereof in the conveyance direction are long and the sides thereof in the nozzle array direction are short. Each of the four predetermined regions S0 is divided into four regions in the width direction of the recording medium S (the movement direction of the movable tray 13*b*). Specifically, the region S1, region S2, region S3, and region S4 are set in this order from the edge toward the center of the recording medium S in the width direction. The ink application amount in each predetermined region S0 is calculated as a sum of products of the ink application amounts in the respective regions S1, S2, S3, and S4 multiplied by the corresponding weighting coefficients.

Thus, to calculate the ink application amount for the predetermined region S0, first, the ink application amount in each of the regions S1, S2, S3, and S4 is calculated based on input image data. For the regions S1, S2, S3, and S4, the corresponding weighting coefficients are respectively set in advance (see FIG. 11B). The ink application amount calculated for a region is multiplied by a weighting coefficient set for the region. Thus, the ink application amount in the region S1 is multiplied by the weighting coefficient "4". The ink application amount in the region S2 is multiplied by the weighting coefficient "3". The ink application amount in the region S3 is multiplied by the weighting coefficient "2". The ink application amount in the region S4 is multiplied by the weighting coefficient "1". Furthermore, the closer to the edge in the width direction a region is, the larger the weighting coefficient for the region is. After that, the calculated values are added together, and the resultant value is set as the ink application amount for the predetermined region S0.

The ink application amount is calculated for each of the four predetermined regions S0 as described above, and a correction value is acquired based on the ink application amount for the predetermined region S0 for which the calculated value is largest. For the correction value, for example, a table in which correction values that are based on the respective ink application amounts are set in advance is stored in, for example, the ROM 203, and a correction value is acquired based on the table. Alternatively, a calculating formula having the ink application amount set as a variable can be stored in, for example, the ROM 203, and the correction value can be acquired based on the calculating formula.

Figure 12:
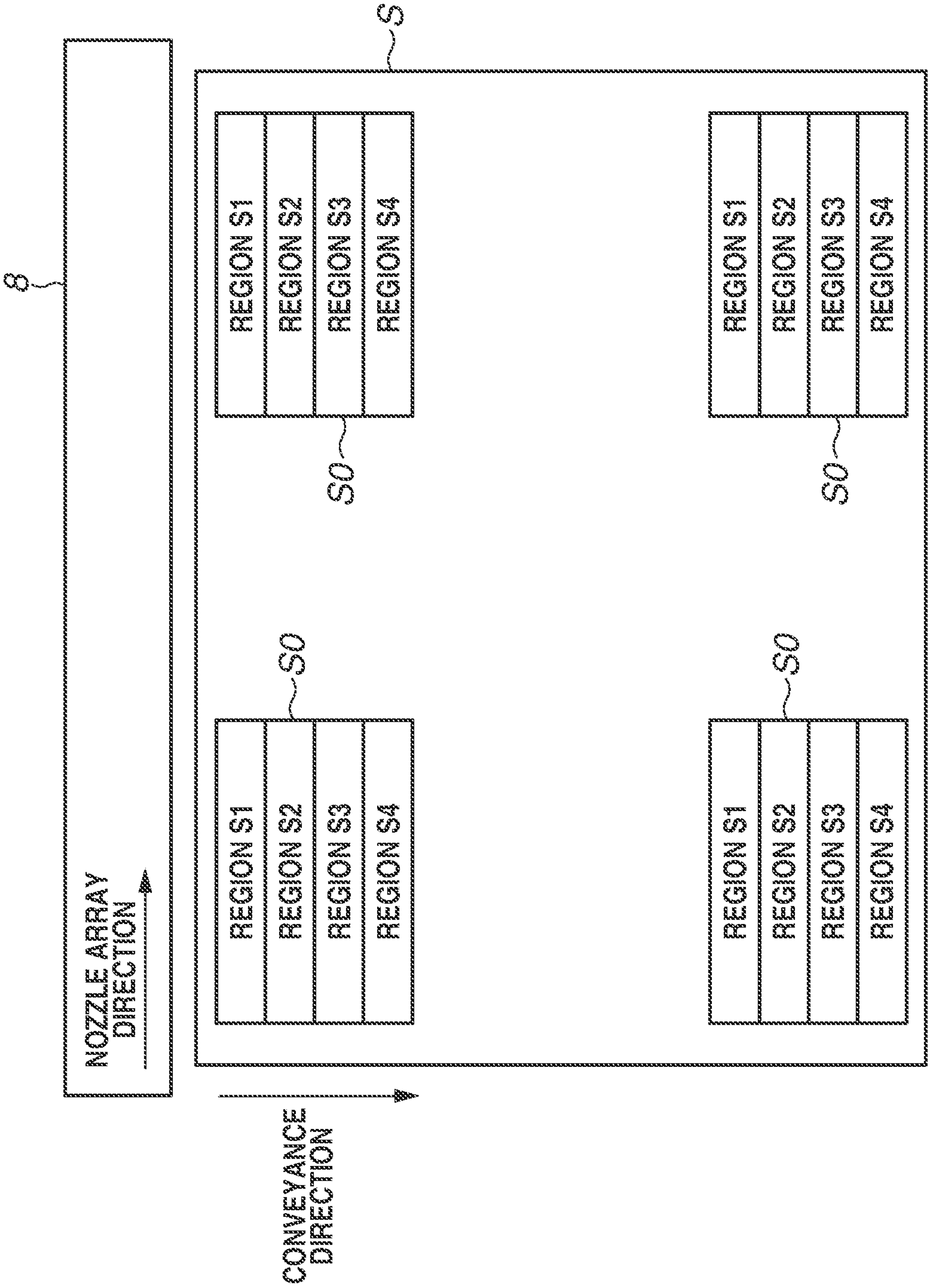
FIG. 12 is a diagram illustrating regions which are to be set in the case of a sheet of transverse grain paper being conveyed in the first exemplary embodiment.

FIG. 12 is a diagram illustrating predetermined regions S0 targeted for calculating the ink application amount in a case where the paper grain direction is a direction perpendicular to the conveyance direction (i.e., a transverse grain direction). In the case of the transverse grain direction, since both edge portions in the conveyance direction are regions having a great influence on curling, the shape of the predetermined region S0 is set in such a manner that the sides thereof in the conveyance direction are short and the sides thereof in the nozzle array direction are long. Each of the four predetermined regions S0 is divided into four regions in the conveyance direction.

Even in the case of the transverse grain direction, weighting coefficients provided for the respective regions of each predetermined region S0 are set as shown in the table illustrated in FIG. 11B.

The size (area) of the predetermined region S0 can be changed according to various conditions, such as the type of recording medium S able to be used and the type of ink to be used, as long as a relationship between the long side and the short side with respect to the paper grain is maintained. Moreover, the position of the predetermined region S0 can be a predetermined distance away from the nearby short side and long side of the recording medium S or can have contact with such short side and long side. Moreover, the distance from the short side to the predetermined region S0 and the distance from the long side to the predetermined region S0 can be set different from each other.

<Acquisition of Monitored Value>

The first exemplary embodiment is configured to acquire the monitored value by adding together a correction value that is based on the ink application amount, a correction value that is based on the type of recording medium S, a correction value that is based on the temperature and humidity environment, and a correction value that is based on the stacking amount and the sort information. For example, in a case where the ink application amount for each region in the predetermined region S0 is 20, the monitored value becomes 20×4+20×3+20×2+20×1=200. The first exemplary embodiment is configured to compare the monitored value acquired in this way with threshold values described below, thus selecting and performing curling prevention or reduction processing.

Selection of curling prevention or reduction processing that is based on the monitored value is determined based on the threshold values set for the curling prevention or reduction processing. In the first exemplary embodiment, the recording apparatus 1 is able to perform first curling prevention or reduction processing and second curling prevention or reduction processing in a recording processing operation for performing recording on the recording media S. In the first curling prevention or reduction processing, the conveyance speed is decreased to cause the recording medium S subjected to recording to stay inside the conveyance pathway for a first time. In the second curling prevention or reduction processing, to cause the recording medium S subjected to recording to stay inside the conveyance pathway for a second time which is longer the first time, the conveyance speed is decreased and, in addition, the recording medium is stopped for only a given time inside the conveyance pathway after recording. Thus, the second curling prevention or reduction processing makes the staying time of the recording medium S inside the conveyance pathway longer than the staying time in the first curling prevention or reduction processing, thus increasing the drying time of ink and enabling discharging the recording medium S with curling thereof sufficiently prevented or reduced.

For the first curling prevention or reduction processing and the second curling prevention or reduction processing, respective different threshold values are set. For example, for the first curling prevention or reduction processing, a first threshold value "220" is set, and for the second curling prevention or reduction processing, a second threshold value "250" is set, which is larger than the first threshold value. When the acquired monitored value is less than 220, no curling prevention or reduction processing is performed, when the acquired monitored value is 220 or more and less than 250, the first curling prevention or reduction processing is performed, and when the acquired monitored value is 250 or more, the second curling prevention or reduction processing is performed. Furthermore, the determination of the curling prevention or reduction processing to be performed in this way is made by the print controller 202. Thus, in the first exemplary embodiment, the print controller 202 is able to determine whether to perform curling prevention or reduction processing, by comparing the monitored value with the threshold values, and also functions as a determining unit capable of determining the curling prevention or reduction processing to be performed.

Figure 13:
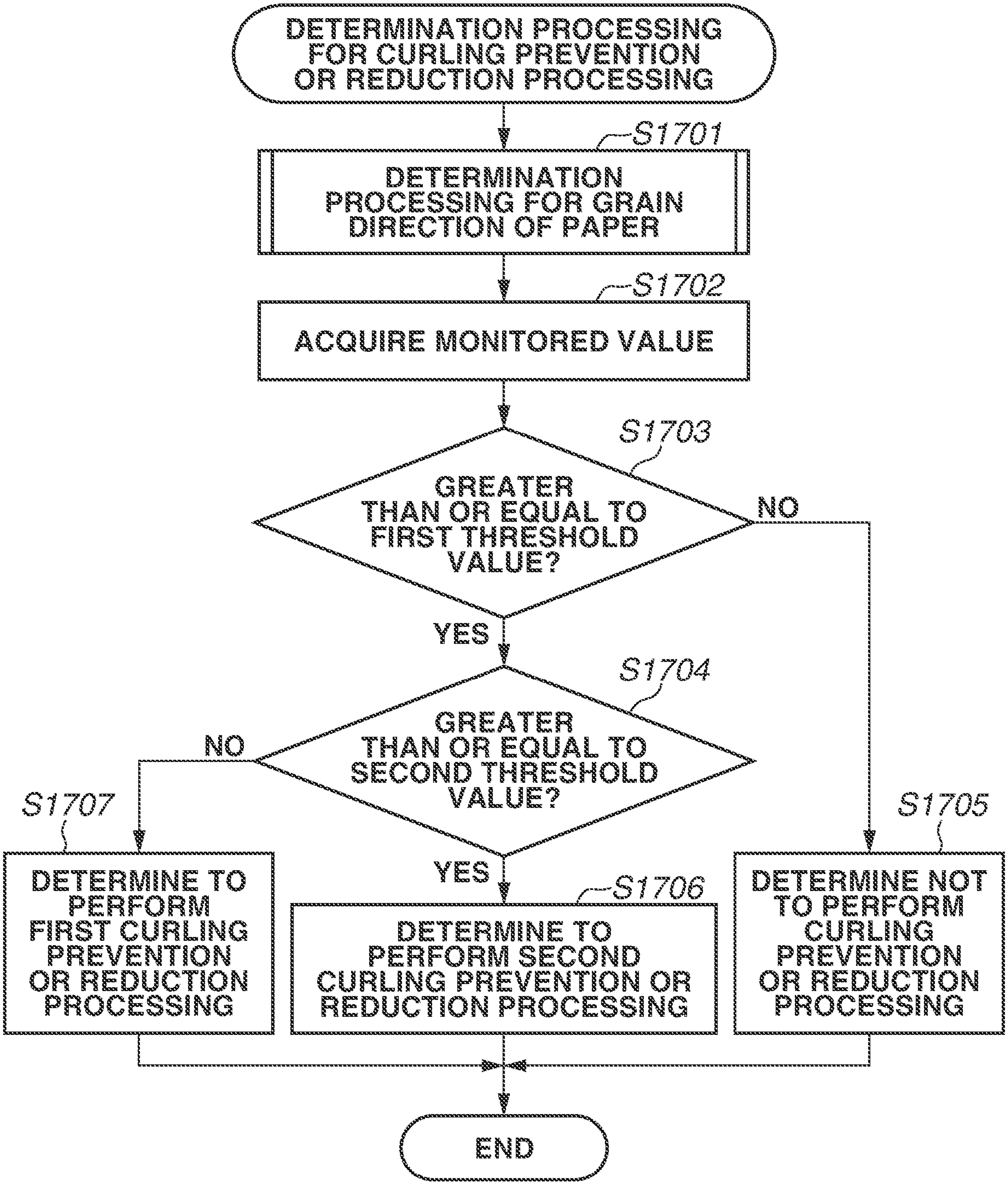
FIG. 13 is a flowchart illustrating determination processing in the first exemplary embodiment.

With the above-described configuration, when the user issues an instruction to start recording with an input of information needed to perform recording on a recording medium S, determination processing for determining curling prevention or reduction processing is performed, and after that, a recording processing operation is performed based on the determined curling prevention or reduction processing. FIG. 13 is a flowchart illustrating the processing details of the determination processing. A series of processing illustrated in the flowchart of FIG. 13 is performed by the print controller 202 loading program code stored in the ROM 203 onto the RAM 204 and executing the program code. Alternatively, a part or all of the functions in steps illustrated in FIG. 13 can be implemented by hardware, such as an application specific integrated circuit (ASIC) or an electronic circuit.

When the determination processing starts, first, in step S1701, the print controller 202 determines the paper grain direction. Details of this processing are described below with reference to FIG. 14. Then, in step S1702, the print controller 202 acquires a monitored value based on the paper grain direction acquired in step S1701 and the ink application amount.

Next, in step S1703, the print controller 202 determines whether the monitored value acquired in step S1702 is greater than or equal to the first threshold value. If it is determined that the monitored value is neither greater than nor equal to the first threshold value (NO in step S1703), then in step S1705, the print controller 202 determines not to perform curling prevention or reduction processing and then ends the determination processing. Moreover, if, in step S1703, it is determined that the monitored value is greater than or equal to the first threshold value (YES in step S1703), then in step S1704, the print controller 202 determines whether the monitored value is greater than or equal to the second threshold value.

If, in step S1704, it is determined that the monitored value is neither greater than nor equal to the second threshold value (NO in step S1704), then in step S1707, the print controller 202 determines to perform the first curling prevention or reduction processing and then ends the determination processing. Thus, in step S1707, during recording processing, the print controller 202 determines to perform the first curling prevention or reduction processing for decreasing the conveyance speed of the recording medium S. Moreover, if, in step S1704, it is determined that the monitored value is greater than or equal to the second threshold value (YES in step S1704), then in step S1706, the print controller 202 determines to perform the second curling prevention or reduction processing and then ends the determination processing. Thus, in step S1706, during recording processing, the print controller 202 determines to perform the second curling prevention or reduction processing for decreasing the conveyance speed of the recording medium S and, in addition, stopping the recording medium S subjected to recording for only a given time.

After that, recording is performed on the recording medium S based on the curling prevention or reduction processing determined by the determining processing and various pieces of information included in a print job. Specifically, in recording processing in which the first curling prevention or reduction processing is performed, a recording operation on the recording medium S is performed with the conveyance speed of the recording medium S decreased from a previously set speed to a speed set for the first curling prevention or reduction processing. Moreover, in recording processing in which the second curling prevention or reduction processing is performed, a recording operation on the recording medium S is performed with the conveyance speed of the recording medium S decreased from a previously set speed to a speed set for the second curling prevention or reduction processing. Additionally, the recording medium S subjected to recording is stopped inside the conveyance pathway for a given time and is then discharged onto the discharge tray 13.

Furthermore, a recording operation which is performed with the curling prevention or reduction processing being performed is performed by the print controller 202 controlling the conveyance control unit 207 and the recording head 8. Thus, in the first exemplary embodiment, the print controller 202 functions as a recording control unit configured to perform recording on the recording media S while performing the curling prevention or reduction processing.

Figure 14:
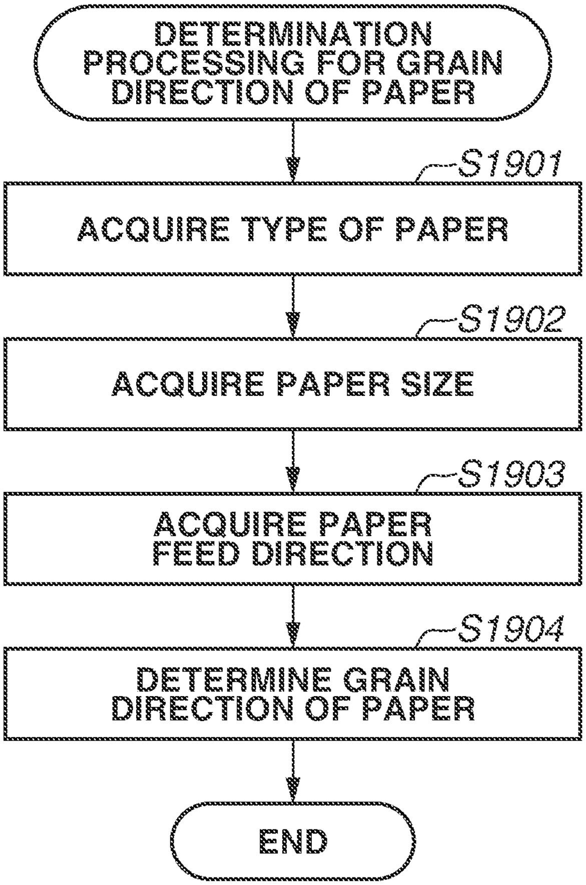
FIG. 14 is a flowchart illustrating determination processing for paper grain direction in the first exemplary embodiment.

FIG. 14 is a flowchart illustrating the flow of determination processing for paper grain direction to be performed in step S1701 illustrated in FIG. 13. In step S1901, the print controller 202 acquires the type of recording medium. The print controller 202 can acquire a type of recording medium input by the user operating the operating panel 104 or can acquire a type of recording medium discriminated by a sensor mounted in the recording apparatus 1 to discriminate the type of recording medium. In step S1902, the print controller 202 acquires the size of recording medium. As with step S1901, the print controller 202 can acquire a size of recording medium input by the user or can acquire a size of recording medium discriminated by a sensor mounted to discriminate the size of recording medium.

In step S1903, the print controller 202 acquires the feed direction of recording medium. As with step S1901, the print controller 202 can acquire a feed direction input by the user or can acquire a feed direction determined based on the direction of a recording medium set in the recording apparatus 1.

In step S1904, the print controller 202 determines the paper grain direction based on the type, size, and feed direction of recording medium acquired in steps S1901 to S1903. FIG. 15 illustrates a paper grain direction determination table. The paper grain direction determination table is stored in the ROM 203, and the print controller 202 determines the paper grain direction according to the paper grain direction determination table. Since, in many cases, the paper grain direction is previously determined depending on the type and size of recording medium, in the first exemplary embodiment, the paper grain direction is set in advance with use of a table. The print controller 202 performs the determination processing illustrated in FIG. 13 based on the paper grain direction determined in this way with respect to the conveyance direction. In a case where the user is able to determine the paper grain direction, a configuration in which the user inputs the paper grain direction to the recording apparatus 1 can be employed.

As described above, determining the presence or absence of execution of curling prevention or reduction processing and the degree of curling prevention or reduction processing based on the paper grain direction relative to the conveyance direction enables performing appropriate curling prevention or reduction processing. Therefore, it is possible to prevent or reduce the occurrence of a jam or prevent or reduce the decrease of recording speed caused by curling prevention or reduction processing being wastefully performed.

A second exemplary embodiment is configured to perform curling prevention or reduction processing different from that in the first exemplary embodiment. The following description is mainly directed to differences from those in the first exemplary embodiment.

Figure 16A:
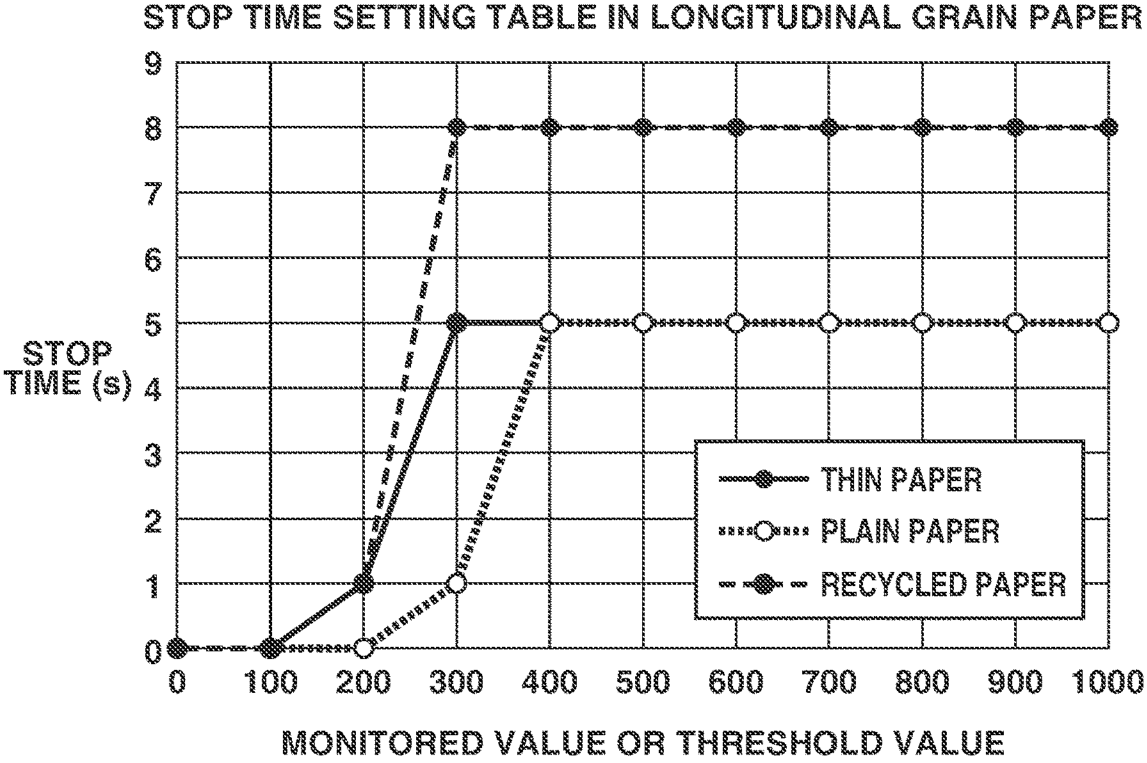
FIGS. 16A and 16B are graphs illustrating stop times which are set depending on paper grain directions in a second exemplary embodiment.
Figure 16B:
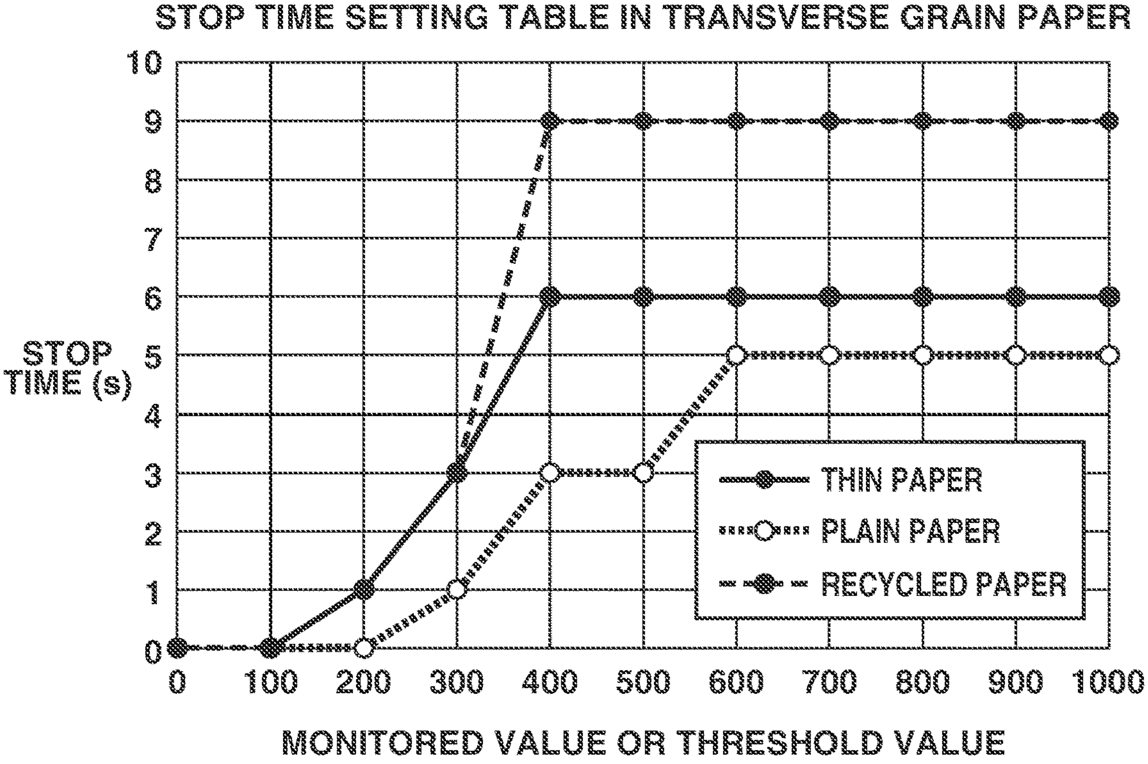

In the second exemplary embodiment, in recording processing in which the second curling prevention or reduction processing is performed, a recording operation on a recording medium S is performed with the conveyance speed of the recording medium S decreased from a previously set speed to a speed set for the second curling prevention or reduction processing. Additionally, after the recording medium S subjected to recording is stopped inside the conveyance pathway for a given time, the recording medium S is discharged to the discharge tray 13. FIGS. 16A and 16B are graphs showing stop times, which are set, according to the paper grain direction, as a time for which the recording medium S subjected to recording is stopped inside the conveyance pathway as the given time. As illustrated in FIGS. 16A and 16B, the second exemplary embodiment is configured to provide tables used to change a time for which the recording medium S subjected to recording is stopped inside the conveyance pathway as the given time, according to, for example, a paper type. Additionally, as illustrated in FIGS. 16A and 16B, the second exemplary embodiment is configured to change the tables depending on the paper grain direction, thus enabling setting such a stop time as to be usable to attain a curling prevention or reduction effect with less waste.

In the above-described exemplary embodiments, curling prevention or reduction processing is determined based on only the ink application amount. In a third exemplary embodiment, curling prevention or reduction processing is also determined based on further conditions.

In the third exemplary embodiment, curling prevention or reduction processing is determined based on four conditions. The four conditions are assumed to be the ink application amount, the type of recording medium S, the temperature and humidity environment, and the stacking amount and sort information. The third exemplary embodiment is configured to acquire a correction value for each of the four conditions and acquire, as a monitored value, a value obtained by adding together the respective acquired correction values. The third exemplary embodiment is configured to compare the acquired monitor value with threshold values associated with curling prevention or reduction processing and then determine curling prevention or reduction processing based on the comparison result.

<Acquisition of Correction Value that is Based on Type of Recording Medium S and Acquisition of Correction Value that is Based on Temperature and Humidity Environment>

FIG. 17A illustrates a table showing correction values set according to the type of recording medium S, and FIG. 17B illustrates a table showing correction values set according to combinations of temperature and humidity.

The table in which correction values are set according to the type of recording medium S (see FIG. 17A) is stored in, for example, the ROM 203. A correction value that is based on the type of recording medium S is obtained from the stored table based on input information about the type of recording medium S.

Moreover, the table in which correction values are set according to combinations of temperature and humidity (see FIG. 17B) is stored in, for example, the ROM 203. A correction value that is based on the temperature and humidity environment is obtained from the stored table based on a detection result obtained by the temperature detection unit 219 and a detection result obtained by the humidity detection unit 220.

Furthermore, for the correction values set in the tables illustrated in FIGS. 17A and 17B, the larger curling is caused by ink application, the larger correction value is set. Moreover, the correction values are not limited to the values shown in FIGS. 17A and 17B. Thus, the correction values can be changed depending on, for example, the type of ink to be used. Additionally, while the correction values that are based on the temperature and humidity environment are obtained with use of a table such as that illustrated in FIG. 17B, the present exemplary embodiment is not limited to this method. For example, a calculating formula having information about temperature and humidity as variables can be stored in, for example, the ROM 203, and the correction value can be calculated based on the calculating formula.

<Acquisition of Correction Value that is Based on Stacking Amount and Sort (Sorting) Information>

In a case where the paper grain direction of a recording medium is a longitudinal grain direction, which is parallel to the conveyance direction, when curling occurs as illustrated in FIG. 10B, the area of contact between the recording medium S and the movable tray 13*b* becomes smaller in the width direction than when no curling occurs. Thus, the recording medium S is unstable on the movable tray 13*b* with respect to a load in the width direction. When the movable tray 13*b* moves in the width direction (y-direction) in this state, the recording medium S on the movable tray 13*b* may move in the width direction. As a result, there is a possibility that the recording media S discharged are unable to be sorted by the movable tray 13*b* in an appropriate manner.

Figure 18:
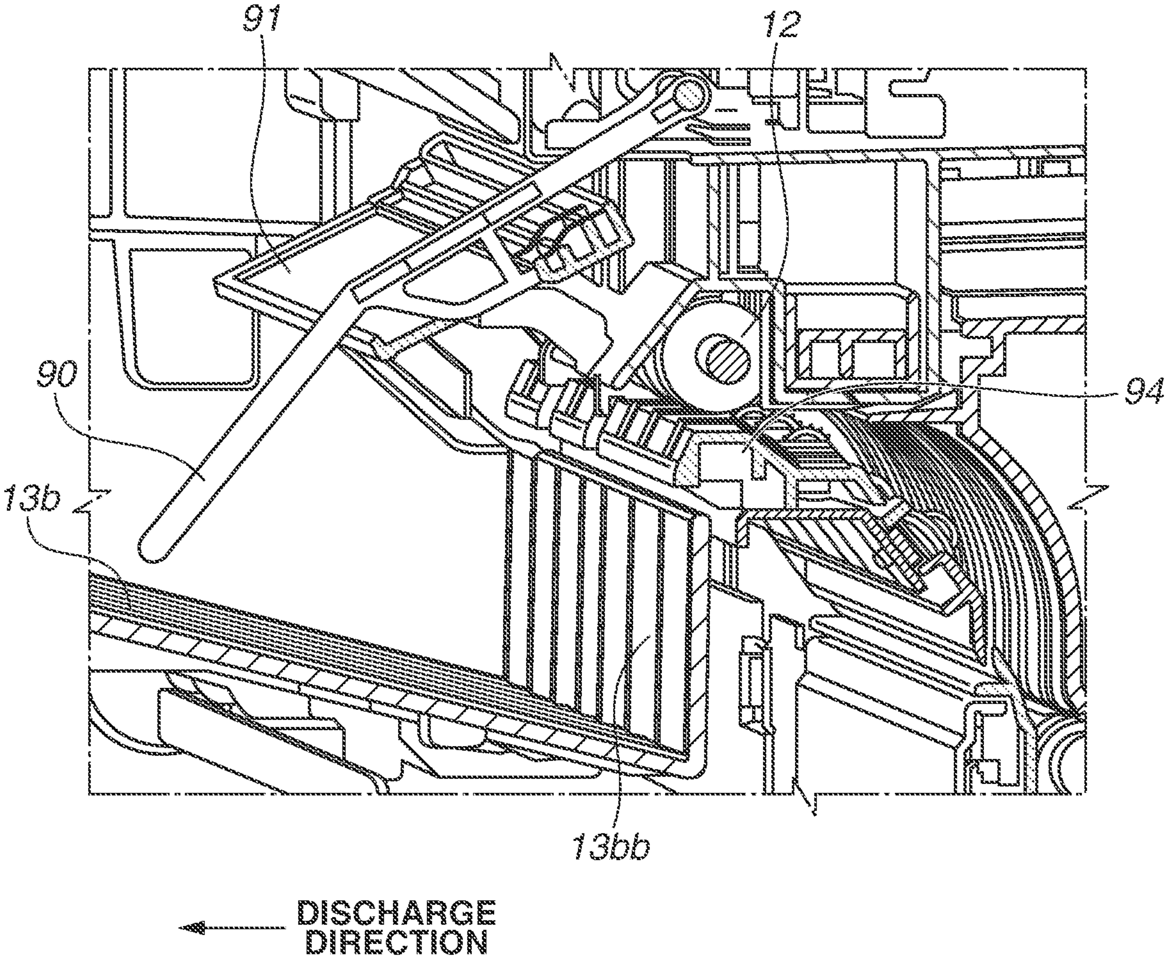
FIG. 18 is a diagram illustrating a configuration of portions near a discharge tray in the first exemplary embodiment.

Moreover, in a case where the paper grain direction of a recording medium is a transverse grain direction, which is perpendicular to the conveyance direction, both end portions of the recording medium S in the width direction may be curled, so that such both end portions in the width direction may come into contact with a member fixedly mounted near the discharge opening 95, such as a spur base 94 (see FIG. 18), in the discharge tray 13. If the movable tray 13*b* moves in a state in which both end portions curled up by curling are in contact with the member fixedly mounted, the recording medium S may turn around the position of the recording medium S that is in contact with the member. This decreases an orderly stacking property of the discharged recording medium S and hinders appropriate sorting of the recording media S. Furthermore, the spur base 94 is located above a vertically arranged surface 13*bb* in the movable tray 13*b* and protrudes downstream in the discharge direction relative to the vertically arranged surface 13*bb*.

FIG. 19A is a diagram illustrating portions near the discharge opening 95 in a case where the stacking amount of recording media S on the discharge tray 13 is less than a predetermined amount, and FIG. 19B is a diagram illustrating portions near the discharge opening 95 in a case where the stacking amount is greater than or equal to the predetermined amount. FIG. 19C illustrates a table showing correction values set according to combinations of the stacking amount and the presence or absence of sort processing (sorting).

In a case where the sort information indicates the absence of sort processing, a curled recording medium S being caught at the spur base 94 due to the movement of the movable tray 13*b* in the width direction does not need to be taken into account, but an opening for discharge, specifically, the discharge pathway of the recording medium from the discharge opening 95, only needs to be secured. Thus, a configuration in which a recording medium S being discharged is prevented from colliding with the trailing edge (the upstream-side end portion in the discharge direction) of a curled portion of a stacked recording medium S only needs to be employed. Accordingly, in the vertical direction (z-direction), the curled recording medium S is made to fall within a distance L1 from the trailing edge (the upstream-side end portion in the discharge direction) of the stacked recording medium to the discharge opening 95. Thus, in a case where a curled recording medium S is stacked onto the recording media S on the discharge tray 13, the trailing edge of the curled recording medium S is made to be positioned below the discharge opening 95.

On the other hand, in a case where the sort information indicates the presence of sort processing, the recording media S being caught at the spur base 94 needs to be taken into account in order to sort stacked recording media S in an appropriate manner Therefore, in the vertical direction (z-direction), the curled recording medium S is made to fall within a distance L2 from the trailing edge of the stacked recording media S to the spur base 94. Thus, in a case where a curled recording medium S is stacked onto the recording media S on the discharge tray 13, the trailing edge of the curled recording medium S is made to be positioned below the spur base 94.

The distance L2 is shorter than the distance L1. Therefore, in the case of the presence of sort processing, the amount of allowable curling is smaller than in the case of the absence of sort processing, so that the amount of curling which is to be prevented or reduced by the curling prevention or reduction processing becomes larger. Accordingly, in the case of the presence of sort processing, the correction value is set larger than in the case of the absence of sort processing.

Moreover, the distances L1 and L2 from the recording medium S stacked on the discharge tray 13 to the discharge opening 95 and the spur base 94, respectively, become shorter in a case where the stacking amount of recording media S on the discharge tray 13 is greater than or equal to a predetermined amount (see FIG. 19B) than in a case where the stacking amount thereof is less than the predetermined amount (see FIG. 19A). Therefore, the amount of allowable curling becomes smaller in a case where the stacking amount of recording media S on the discharge tray 13 is greater than or equal to the predetermined amount than in a case where the stacking amount thereof is less than the predetermined amount, so that the amount of curling which is to be prevented or reduced by the curling prevention or reduction processing becomes larger. Accordingly, the correction value becomes larger in a case where the stacking amount of recording media S on the discharge tray 13 is greater than or equal to the predetermined amount than in a case where the stacking amount thereof is less than the predetermined amount. Furthermore, in the third exemplary embodiment, the predetermined amount for the stacking amount is set to 14 mm. The predetermined amount for the stacking amount is not limited to 14 mm, but can be changed depending on, for example, a configuration of the recording apparatus 1.

On the basis of these viewpoints, a table in which correction values are set according to combinations of the stacking amount and the presence or absence of sort processing (see FIG. 19C), is created and stored in the ROM 203. A correction value that is based on the stacking amount and the presence or absence of sort processing is acquired from the stored table based on the information about the stacking amount acquired by the stacking amount detection unit 214 and the setting information about the presence or absence of sort processing.

Furthermore, for the correction values set in the table illustrated in FIG. 19C, the correction value becomes larger in a case where the stacking amount is greater than or equal to the predetermined amount than in a case where the stacking amount is less than the predetermined amount. The correction value also becomes larger in the case of the presence of sort processing than in the case of the absence of sort processing. While correction values are set in two steps with a predetermined amount set as a threshold value, i.e., a case where the stacking amount is greater than or equal to the predetermined amount and a case where the stacking amount is less than the predetermined amount, the present exemplary embodiment is not limited to this setting, and the correction values can be set in three or more steps. In this case, increasing the number of sensors and flags as appropriate enables the stacking amount detection unit 214 to detect the stacking amount in three or more steps.

The third exemplary embodiment is configured to acquire a monitored value to be acquired in step S1702 illustrated in FIG. 13, by adding together a correction value that is based on the ink application amount, a correction value that is based on the type of recording medium S, a correction value that is based on the temperature and humidity environment, and a correction value that is based on the stacking amount and the sort information. For example, in a case where the ink application amount in the predetermined region S0 is 260, the type of recording medium S is plain paper, the temperature is 30° C., the humidity is 60%, the stacking amount is 5 mm, and the sort processing is present, the correction values become as follows. The correction value that is based on the ink application amount is "260", the correction value that is based on the type of recording medium S is "30", the correction value that is based on the temperature and humidity environment is "−80", and the correction value that is based on the stacking amount and the sort information is "20".

Accordingly, the monitored value is 260+30+(−80)+20=230.

Determining curling prevention or reduction processing based on a plurality of conditions in the above-mentioned way enables performing appropriate processing.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

According to the above-described exemplary embodiments, changing a region targeted for obtaining an ink application amount to prevent or reduce curling occurring in a recording medium according to the paper grain direction relative to the conveyance direction enables performing appropriate curling prevention or reduction processing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-058389 filed Mar. 30, 2021, which is hereby incorporated by reference herein in its entirety.

What is claimed is:

1. A recording apparatus comprising:

a printer configured to perform a recording operation by applying ink a paper;

a conveyer configured to convey the paper in a conveyance direction; and a processor and a memory in communication with each other to perform operations including:

determining, as relative direction information, a grain direction of the paper relative to a conveyance direction in which the conveyer is to convey the paper, setting a predetermined region of the paper based on the determined relative direction information, acquiring information related to an ink application amount of ink which is to be applied by the printer to the set predetermined region of the paper, and determining, based on the acquired ink application amount information, execution of curling prevention or reduction processing for preventing or reducing curling of the paper occurring after recording operation performed by the printer.

2. The recording apparatus according to claim 1, wherein setting includes setting the predetermined region at a corner of the paper and, in a case where the paper grain direction is parallel to the conveyance direction, setting includes setting a length in the conveyance direction of the predetermined region that is longer than a length in a direction perpendicular to the conveyance direction of the predetermined region.

3. The recording apparatus according to claim 2, wherein, in a case where the paper grain direction is parallel to the conveyance direction, (i) the predetermined region is divided in a direction perpendicular to the conveyance direction and (ii) regions obtained by dividing the predetermined region have respective coefficients set in such a manner that a value of each coefficient becomes larger as the regions shift from a central portion to an end portion of the paper in a perpendicular direction, and wherein the ink application amount in the predetermined region is a value obtained by adding together values obtained by multiplying the ink application amounts in the respective regions by the respective coefficients.

4. The recording apparatus according to claim 1, wherein setting includes setting the predetermined region at a corner of the paper and, in a case where the paper grain direction is a direction intersecting with the conveyance direction, setting includes setting a length in the conveyance direction of the predetermined region that is shorter than a length in a direction perpendicular to the conveyance direction of the predetermined region.

5. The recording apparatus according to claim 4, wherein, in a case where the paper grain direction is a direction intersecting with the conveyance direction, (i) the predetermined region is divided in the conveyance direction and (ii) regions obtained by dividing the predetermined region have respective coefficients set in such a manner that a value of each coefficient becomes larger as the regions shift from a central portion to an end portion of the paper in the conveyance direction, and wherein the ink application amount in the predetermined region is a value obtained by adding together values obtained by multiplying the ink application amounts in the respective regions by the respective coefficients.

6. The recording apparatus according to claim 1, where determining the relative direction information includes determining a paper grain direction relative to the conveyance direction based on a type of paper, a size of paper, and a feed direction of paper.

7. The recording apparatus according to claim 1, wherein setting includes setting the predetermined region at four corners of the paper.

8. The recording apparatus according to claim 1, wherein, determining execution includes determining the execution of the curling prevention or reduction processing in such a way as to vary a stay time of a paper in a conveyance pathway through which the paper is conveyed.

9. The recording apparatus according to claim 8, wherein the curling prevention or reduction processing includes:

processing to decrease a conveyance speed of the paper in the conveyance pathway, and processing to stop the paper subjected to recording operation inside the conveyance pathway for a given time.

10. The recording apparatus according to claim 1, further comprising:

a temperature detector configured to detect temperature; and a humidity detector configured to detect humidity, wherein determining the execution of curling prevention or reduction processing includes using a condition that includes a detection result obtained by the temperature detector and a detection result obtained by the humidity detector.

11. The recording apparatus according to claim 1, further comprising a discharge tray configured to receive the paper from the conveyer, wherein the discharge tray includes a movable portion that is movable, wherein the discharge tray is configured to stack, on the discharge tray, paper discharged by the conveyer after being subjected to recording operation by the printer, and wherein determining the execution of curling prevention or reduction processing includes using a condition that includes whether to perform sort processing on paper stacked on the discharge tray by moving the movable portion.

12. The recording apparatus according to claim 1, wherein, in a case where it is determined that the paper grain direction is different from the conveyance direction, setting the predetermined region includes setting sides of the predetermined region in the conveyance direction at a first length and sides of the predetermined region in a nozzle array direction at a second length that is longer than the first length.

13. The recording apparatus according to claim 1, wherein the printer includes a recording operation head and the conveyer includes conveyance rollers, a discharge roller, pinch rollers, spurs, a guide, and an inner guide, and wherein the conveyer is configured to convey the paper through a conveyance pathway after the recording operation is performed.

14. The recording apparatus according to claim 1, wherein the paper to be discharged to the discharge tray has a paper grain direction that is either a longitudinal grain arranged in a direction that is parallel to a discharge conveyance direction or has a transverse grain arranged in a direction that is perpendicular to the discharge conveyance direction.

15. The recording apparatus according to claim 1, wherein determining the execution of curling prevention or reduction processing includes:

acquiring a correction value based on the acquired ink application amount information, determining a monitored value based on the acquired ink application amount information and the acquired correction value, and comparing the monitored value with threshold values to determine execution of the curling prevention or reduction processing.

16. The recording apparatus according to claim 15, wherein the operations further include performing the recording operation after determining the execution of curling prevention or reduction processing such that, after executing the curling prevention or reduction processing, decrease in an orderly stacking property of discharged paper S from a discharged paper S residing in an unstable state due to curling of the discharged paper S is suppressed.

17. A method for a recording apparatus having a printer configured to perform a recording operation by applying ink a paper, and a conveyer configured to convey the paper in a conveyance direction, the method comprising:

determining, as relative direction information, a grain direction of the paper relative to a conveyance direction in which the conveyer is to convey the paper;

setting a predetermined region of the paper based on the determined relative direction information;

acquiring information related to an ink application amount of ink which is to be applied by the printer to the set predetermined region of the paper; and determining, based on the acquired ink application amount information, execution of curling prevention or reduction processing for preventing or reducing curling of the paper occurring after recording operation performed by the printer.

* * * * *